(12) United States Patent
Smith, III et al.

(10) Patent No.: US 11,920,704 B2
(45) Date of Patent: Mar. 5, 2024

(54) UNDERSEA HYDRAULIC COUPLING WITH MULTIPLE PRESSURE-ENERGIZED METAL SEALS

(71) Applicant: National Coupling Company, Inc., Stafford, TX (US)

(72) Inventors: Robert E. Smith, III, Missouri City, TX (US); Scott Stolle, Stafford, TX (US); Chris Roy, Stafford, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 18/109,755

(22) Filed: Feb. 14, 2023

(65) Prior Publication Data
US 2023/0194025 A1 Jun. 22, 2023

Related U.S. Application Data

(63) Continuation of application No. 16/893,113, filed on Jun. 4, 2020, now Pat. No. 11,614,187, which is a
(Continued)

(51) Int. Cl.
F16L 17/03 (2006.01)
E21B 33/12 (2006.01)
(Continued)

(52) U.S. Cl.
CPC .......... *F16L 17/03* (2013.01); *E21B 33/1212* (2013.01); *F16L 17/08* (2013.01); *E21B 2200/01* (2020.05); *F16L 37/34* (2013.01)

(58) Field of Classification Search
CPC ......... F16L 37/34; F16L 17/03; F16L 17/035; F16L 17/08; F16J 15/28; F16J 15/0887;
(Continued)

(56) References Cited

U.S. PATENT DOCUMENTS 3,288,472 A 11/1966 Watkins
3,915,462 A 10/1975 Bruns et al.
(Continued)

FOREIGN PATENT DOCUMENTS

DE 19900998 A1 7/1999

OTHER PUBLICATIONS

Office Action issued in counterpart German Application No. 10 2017 217 604.0, dated Apr. 2, 2019.
(Continued)

Primary Examiner — Nicholas L Foster
(74) Attorney, Agent, or Firm — Cabello Hall Zinda, PLLC

(57) ABSTRACT

A female undersea hydraulic coupling member is equipped with a plurality of pressure-energized metal seals configured to seal between the body of the female member and the probe of a corresponding male hydraulic coupling member in response to ambient hydrostatic pressure and/or hydraulic fluid pressure. Pressure-energized metal seals may also be provided to seal between the body of the female coupling member and a removable seal retainer or seal cartridge. In one particular preferred embodiment, the pressure-energized seals are back-to-back metal C-seals separated by annular seal supports having a generally T-shaped cross section and retained on one or more shoulders in the body of the female member by a removable seal cartridge.

20 Claims, 18 Drawing Sheets

Related U.S. Application Data continuation-in-part of application No. 16/439,402, filed on Jun. 12, 2019, now Pat. No. 11,512,553, which is a continuation of application No. 15/720,663, filed on Sep. 29, 2017, now Pat. No. 10,400,541.

(60) Provisional application No. 62/404,043, filed on Oct. 4, 2016.

(51) Int. Cl.
*F16L 17/08* (2006.01)
*F16L 37/34* (2006.01)

(58) Field of Classification Search
CPC ............... E21B 33/038; E21B 33/1212; E21B 2200/01; E21B 2033/005
See application file for complete search history.

(56) References Cited

U.S. PATENT DOCUMENTS

| | | |
|---|---|---|
| 4,302,020 A | 11/1981 | Morales |
| 4,592,558 A | 6/1986 | Hopkins |
| 4,694,859 A | 9/1987 | Smith, III |
| 4,706,970 A | 11/1987 | Ramirez |
| 4,817,668 A | 4/1989 | Smith, III |
| 4,832,080 A | 5/1989 | Smith, III |
| 4,884,584 A | 12/1989 | Smith |
| 5,029,613 A | 7/1991 | Smith, III |
| 5,099,882 A | 3/1992 | Smith, III |
| 5,203,374 A | 4/1993 | Smith, III |
| 5,232,021 A | 8/1993 | Smith |
| 5,277,225 A | 1/1994 | Smith |
| 5,284,183 A | 2/1994 | Smith, III |
| 5,339,861 A | 8/1994 | Smith, III |
| 5,355,909 A | 10/1994 | Smith, III |
| 5,368,070 A | 11/1994 | Bosley |
| 5,810,047 A * | 9/1998 | Kirkman ............... F16L 17/035 277/653 |
| 5,979,499 A | 11/1999 | Smith |
| 5,983,934 A | 11/1999 | Smith, III |
| 6,164,663 A | 12/2000 | Turner |
| 6,179,002 B1 | 1/2001 | Smith |
| 6,302,402 B1 | 10/2001 | Rynders et al. |
| 6,575,430 B1 | 6/2003 | Smith |
| 6,663,144 B1 | 12/2003 | Smith, III |
| 6,923,476 B2 | 8/2005 | Smith et al. |
| 6,962,347 B2 | 11/2005 | Smith et al. |
| 6,983,940 B2 | 1/2006 | Halling |
| 7,021,677 B2 | 4/2006 | Smith, III |
| 7,063,328 B2 | 6/2006 | Smith, III |
| 7,159,616 B2 | 1/2007 | Watson et al. |
| 7,163,190 B2 | 1/2007 | Smith et al. |
| 7,201,381 B2 | 4/2007 | Halling |
| 7,303,194 B2 | 12/2007 | Smith, III et al. |
| 7,575,256 B2 | 8/2009 | Smith et al. |
| 7,578,312 B2 | 8/2009 | Smith, III |
| 7,789,397 B2 * | 9/2010 | Halling ................ F16J 15/0887 277/614 |
| 7,810,785 B2 | 10/2010 | Smith et al. |
| 9,145,983 B2 | 9/2015 | Smith, III |
| 9,797,513 B2 | 10/2017 | Whitlow et al. |
| 10,400,541 B2 | 9/2019 | Smith, III et al. |
| 10,557,577 B2 | 2/2020 | Smith, III et al. |
| 11,614,187 B2 * | 3/2023 | Smith, III ............... F16L 17/03 137/614.04 |
| 2003/0222410 A1 | 12/2003 | Williams et al. |
| 2004/0084902 A1 | 5/2004 | Smith |
| 2005/0023769 A1 * | 2/2005 | Halling ................ F16J 15/0887 277/602 |
| 2005/0082832 A1 | 4/2005 | Smith |
| 2006/0102238 A1 | 5/2006 | Watson et al. |
| 2006/0255548 A1 * | 11/2006 | Halling ................ F16J 15/0887 277/644 |
| 2007/0235948 A1 * | 10/2007 | Halling ................ F16J 15/0887 277/626 |
| 2008/0245426 A1 | 10/2008 | Smith, III |
| 2009/0200793 A1 | 8/2009 | Smith, III |
| 2010/0024907 A1 | 2/2010 | Tibbitts |
| 2012/0061922 A1 | 3/2012 | Whitlow et al. |
| 2014/0131606 A1 | 5/2014 | Smith, III |
| 2017/0254461 A1 | 9/2017 | Smith, III |
| 2018/0094498 A1 | 4/2018 | Smith, III et al. |
| 2018/0106403 A1 | 4/2018 | Smith, III et al. |
| 2019/0352996 A1 | 11/2019 | Smith, III et al. |
| 2020/0332621 A1 | 10/2020 | Smith, III et al. |
| 2022/0056997 A1 | 2/2022 | Armitage et al. |

OTHER PUBLICATIONS

Search Report issued in counterpart Great Britain Application No. GB1716198.5 dated Oct. 5, 2018.

* cited by examiner

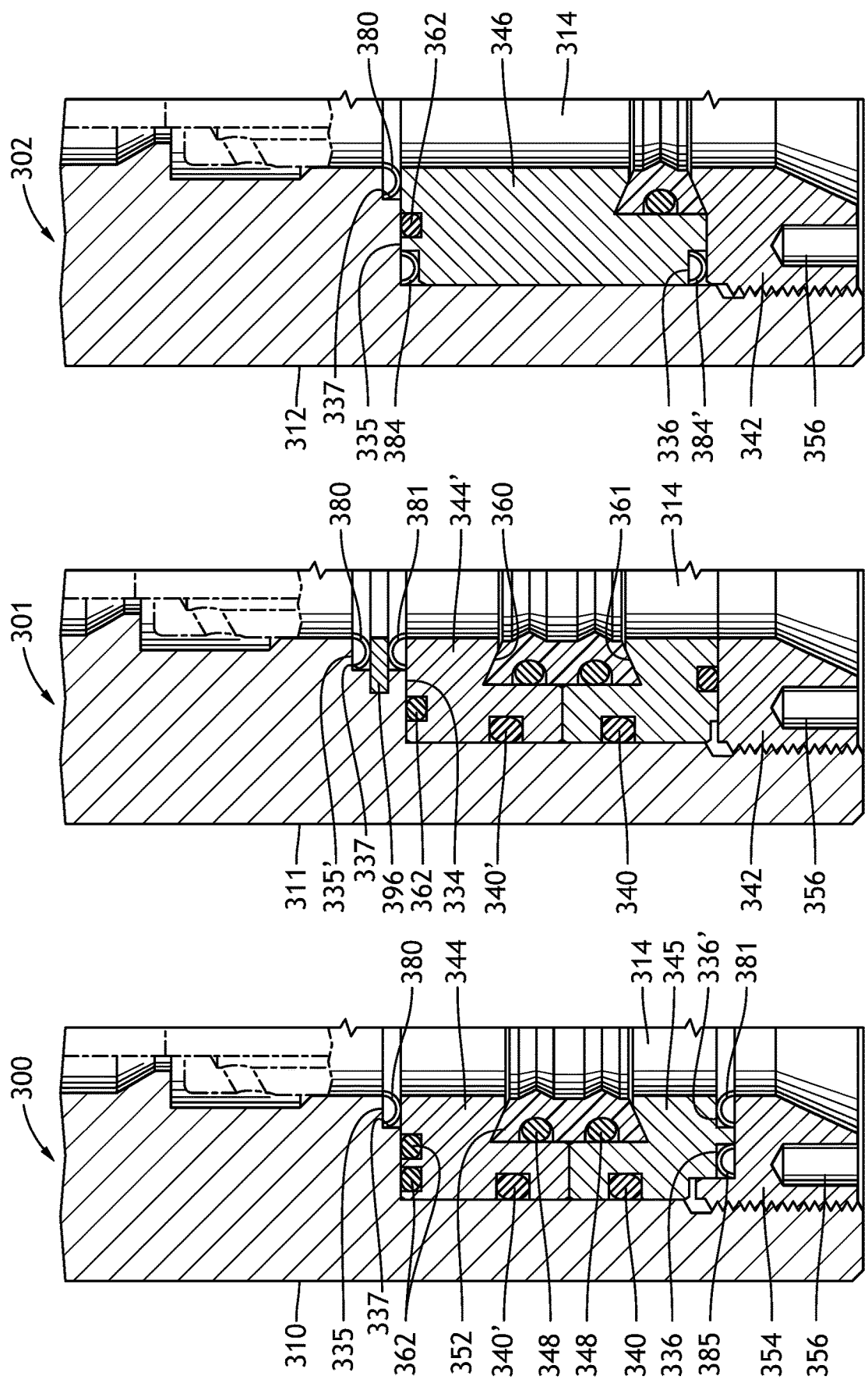

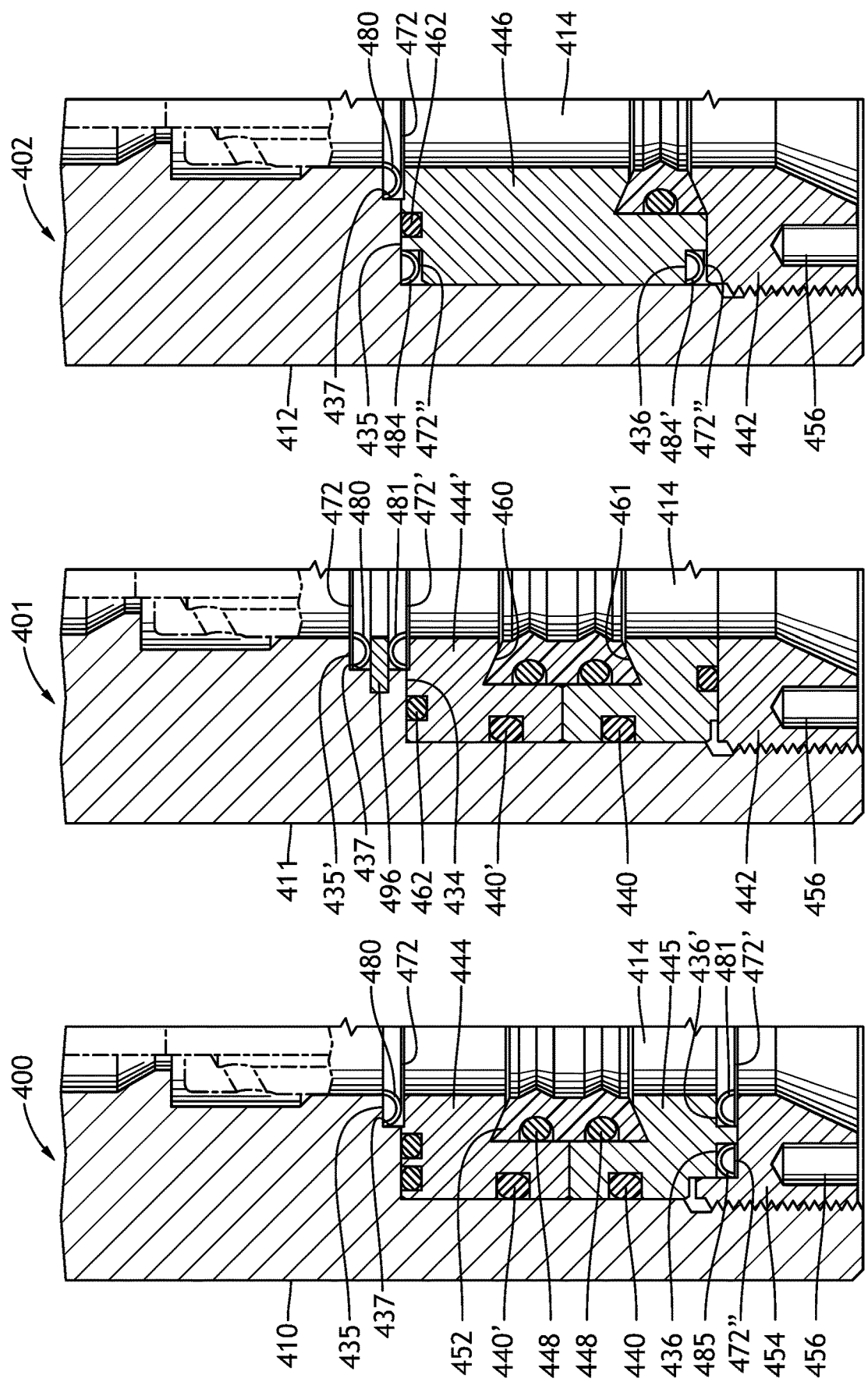

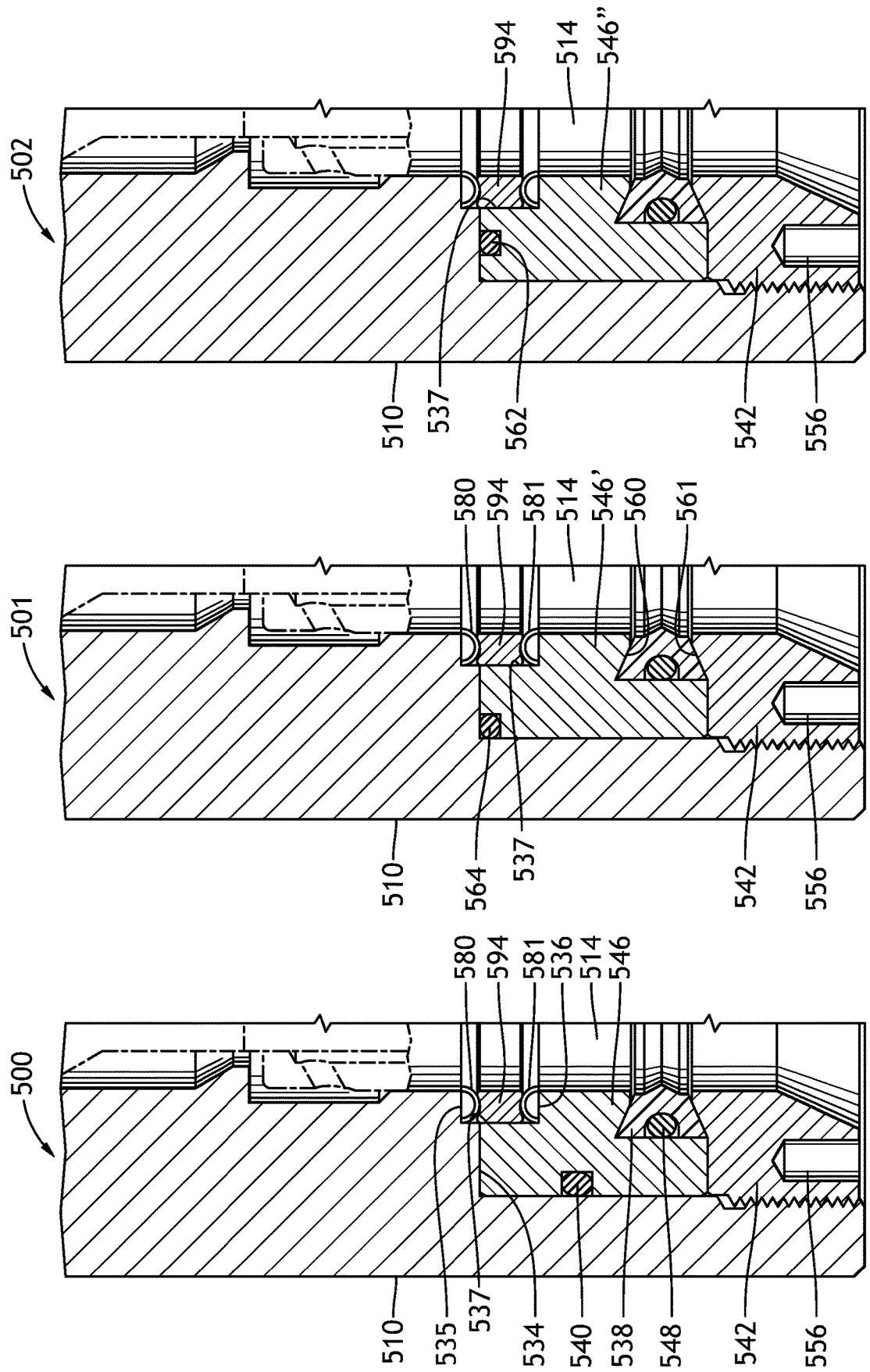

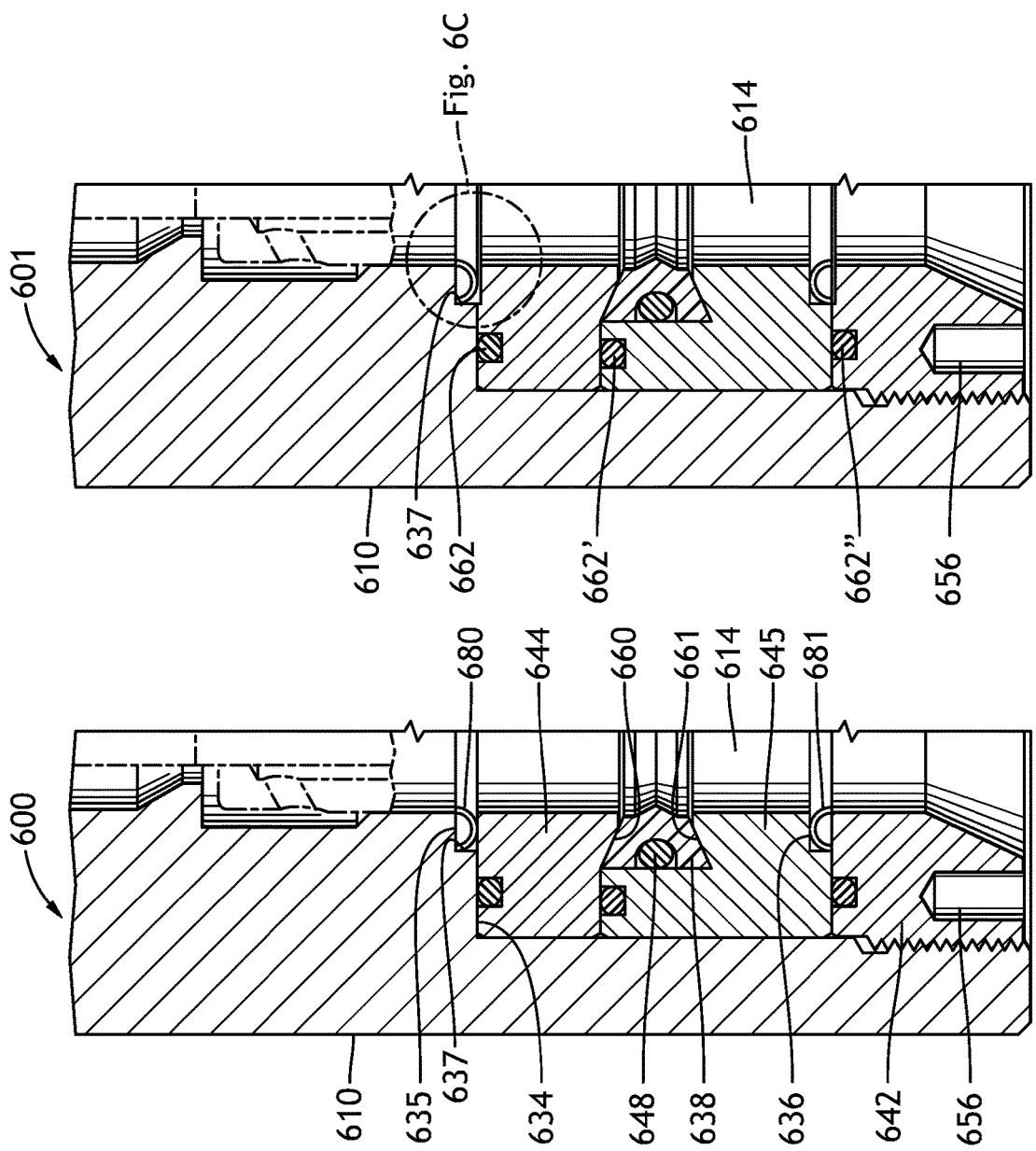

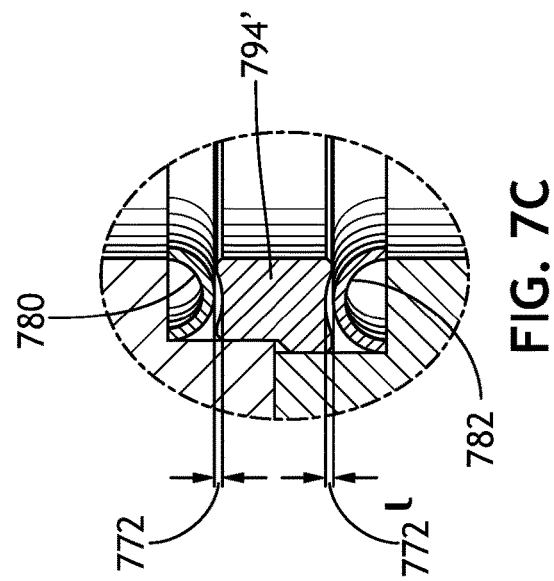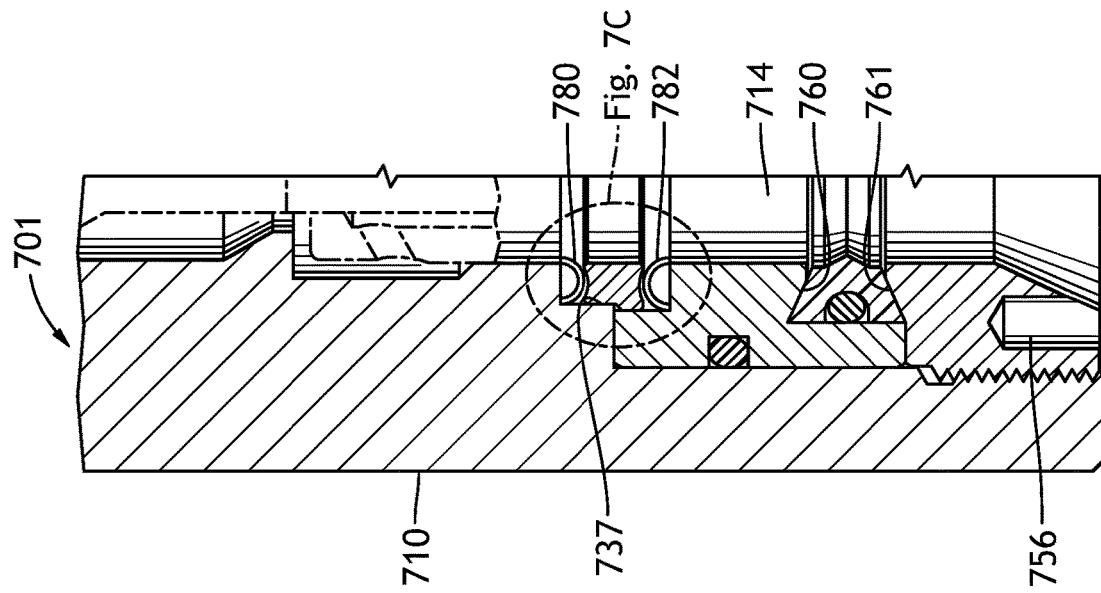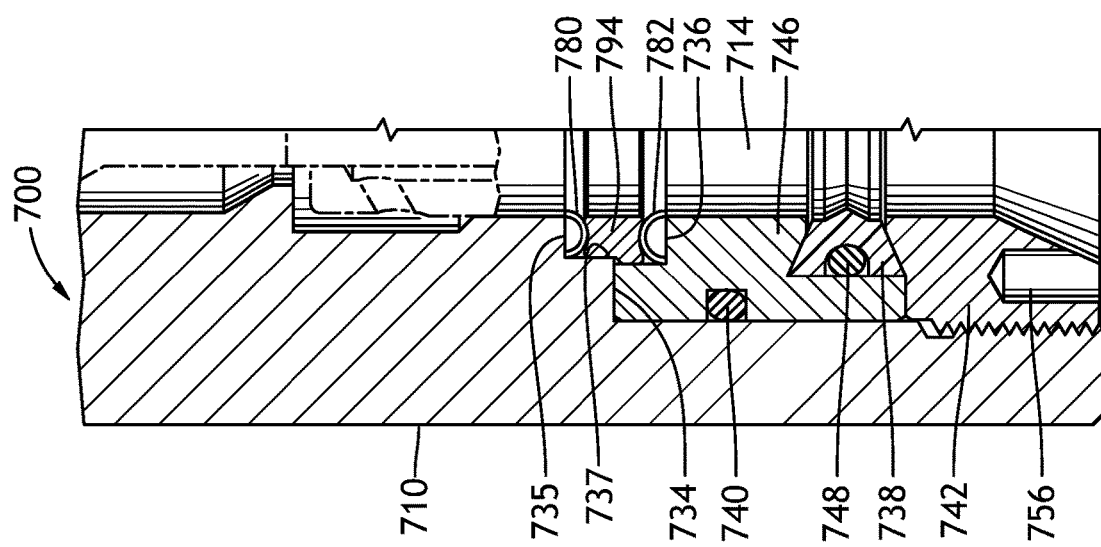

FIG. 9A
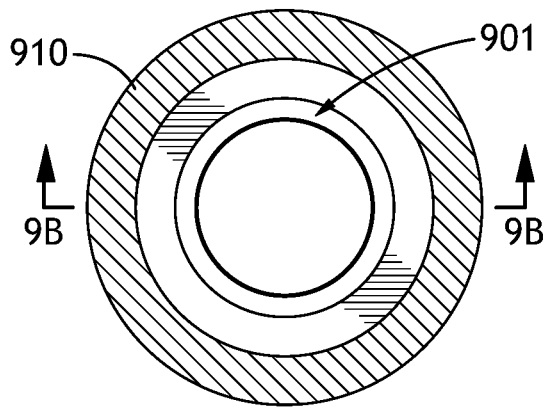
FIG. 9B
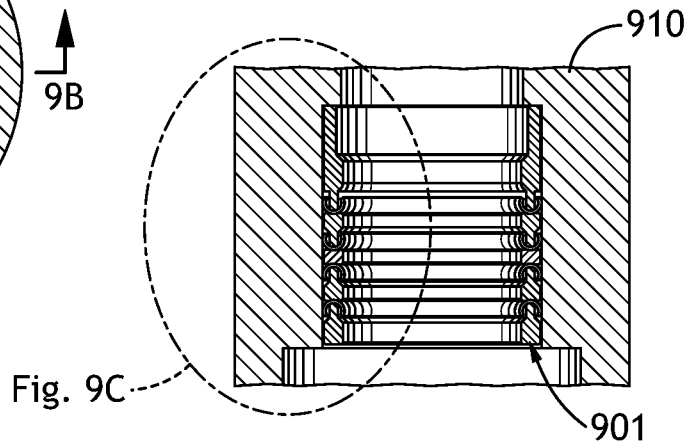
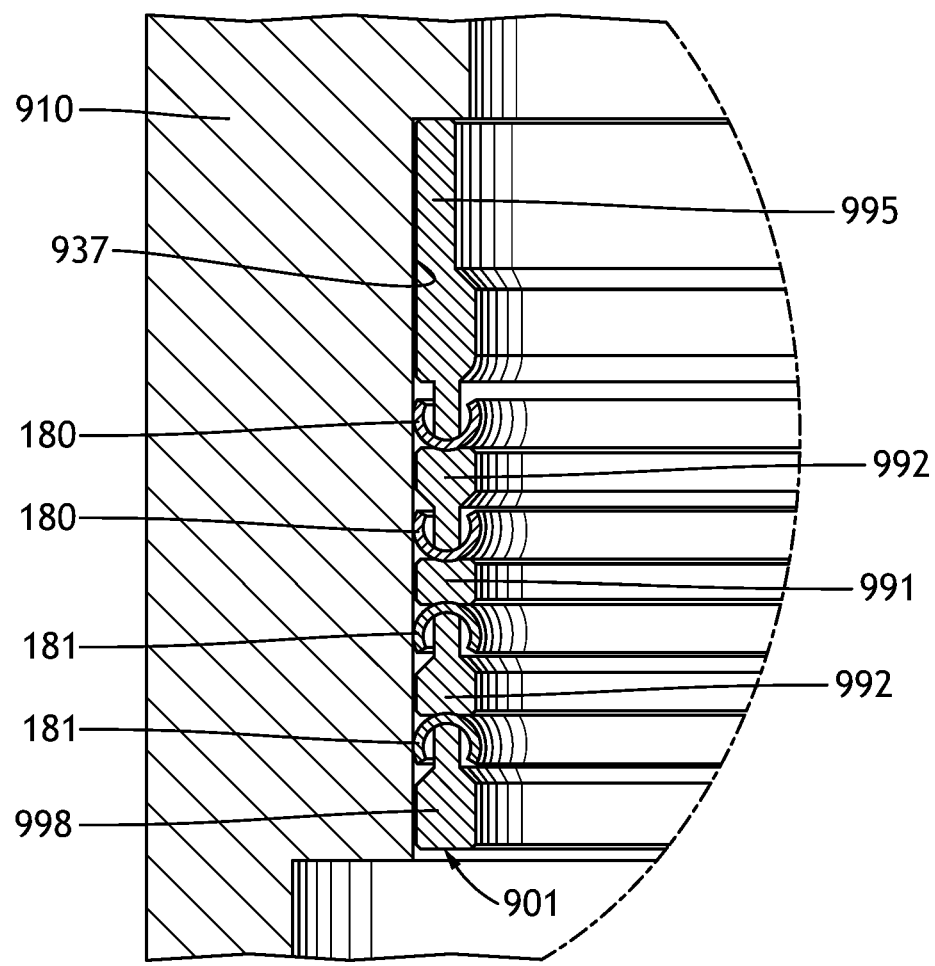
FIG. 9C

FIG. 11A
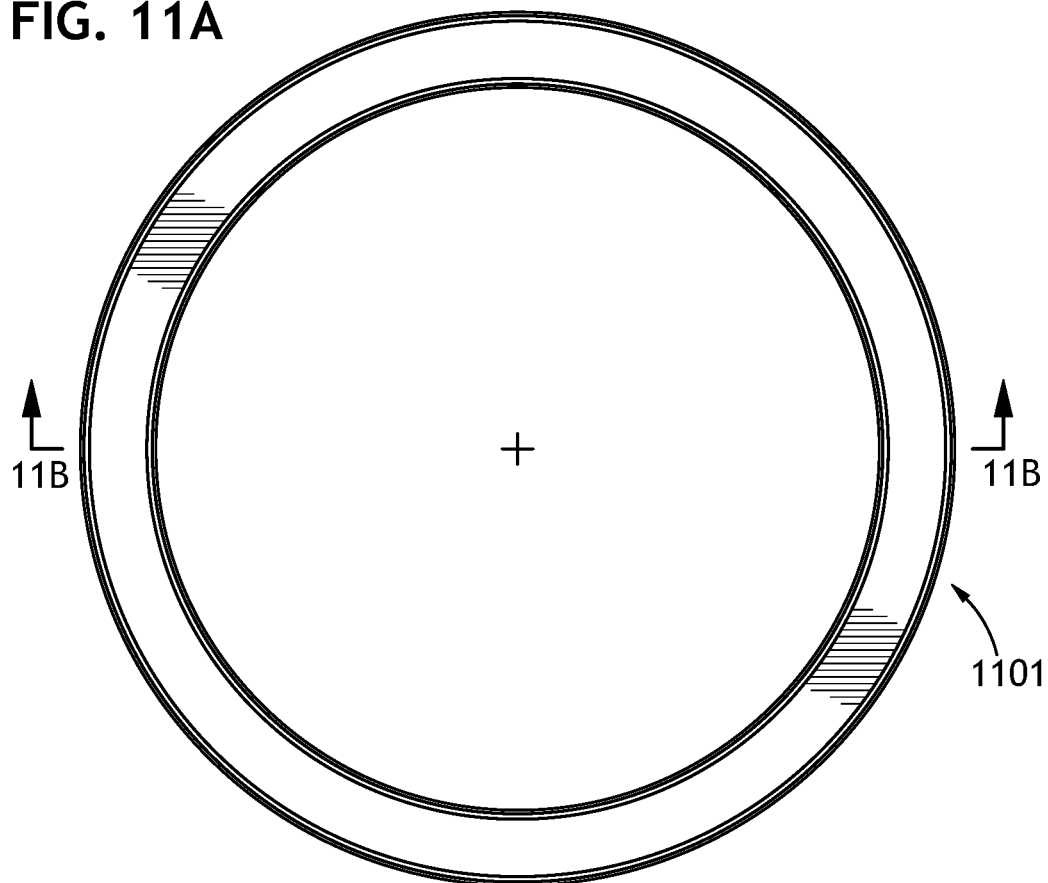
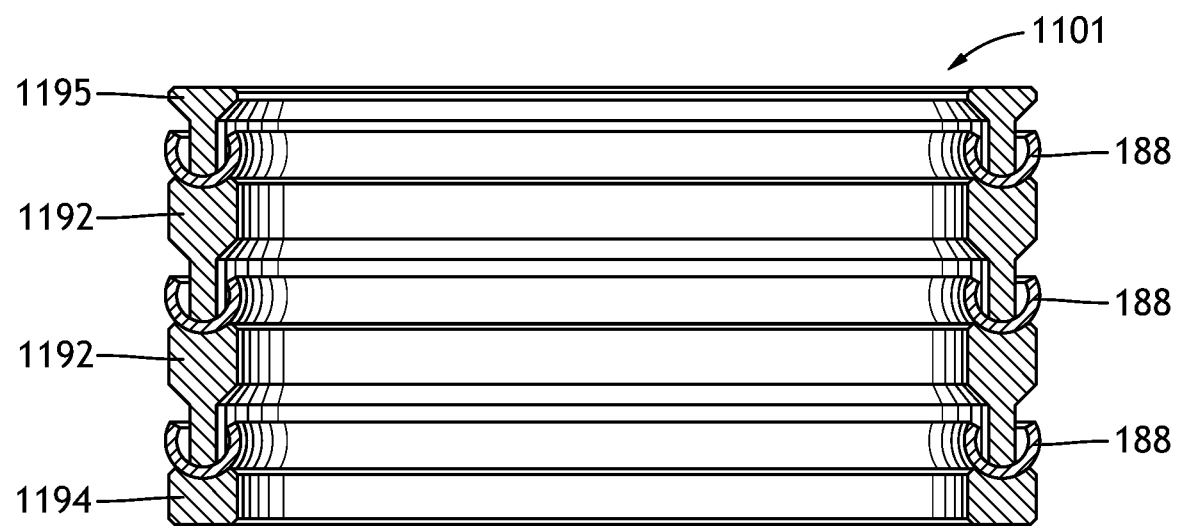
FIG. 11B

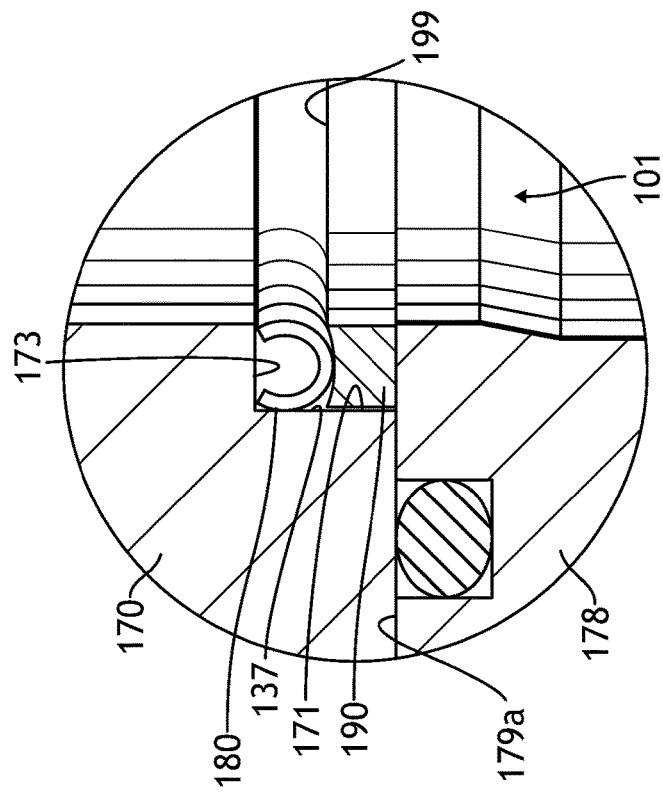
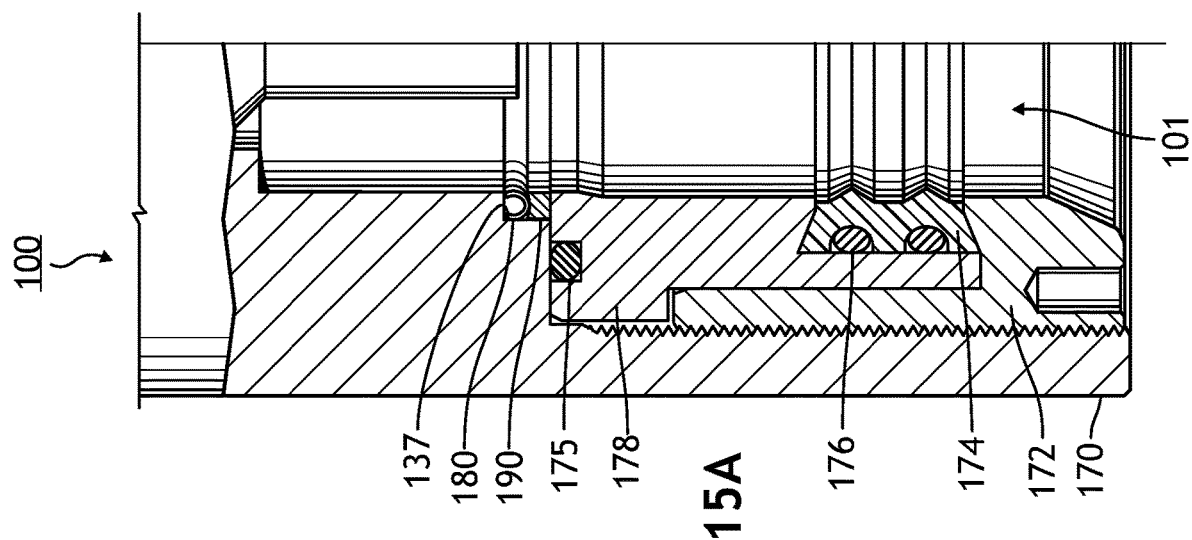

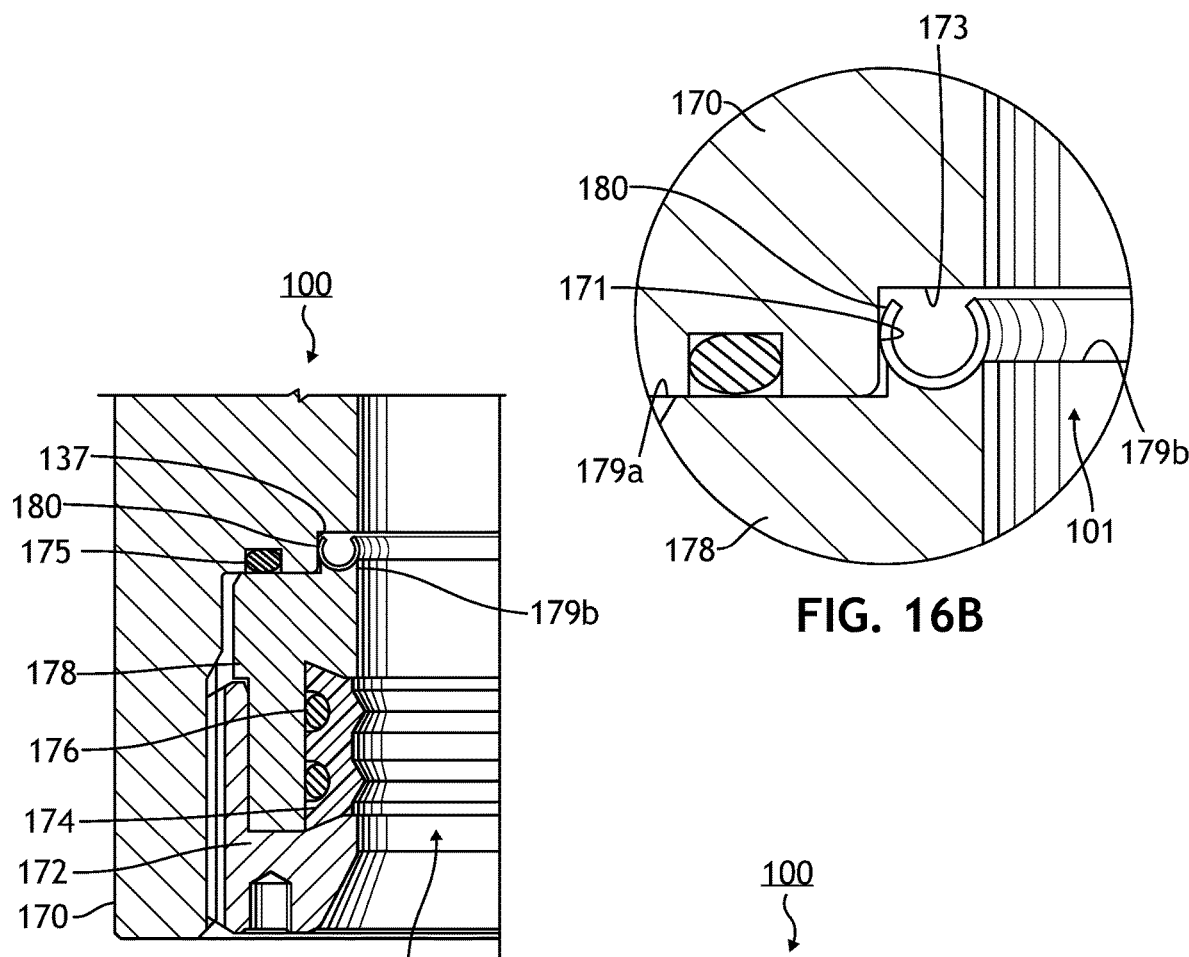
FIG. 16B
FIG. 16A
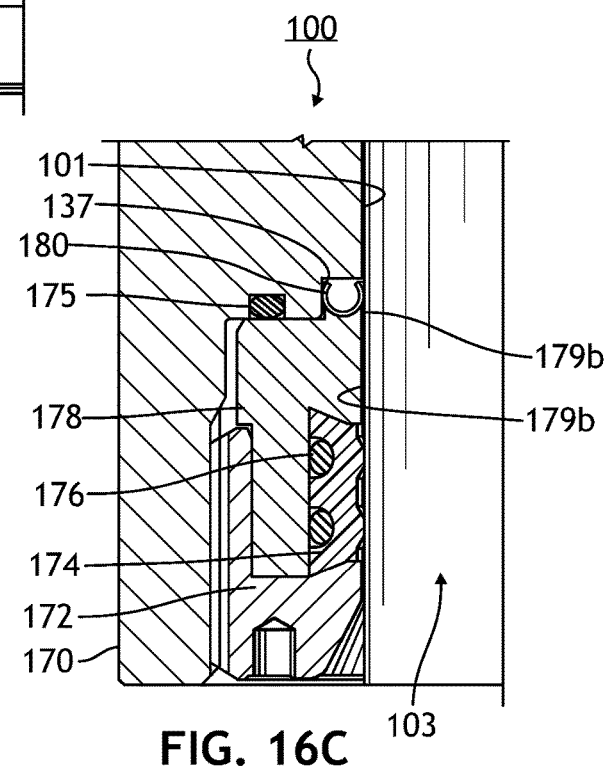
FIG. 16C

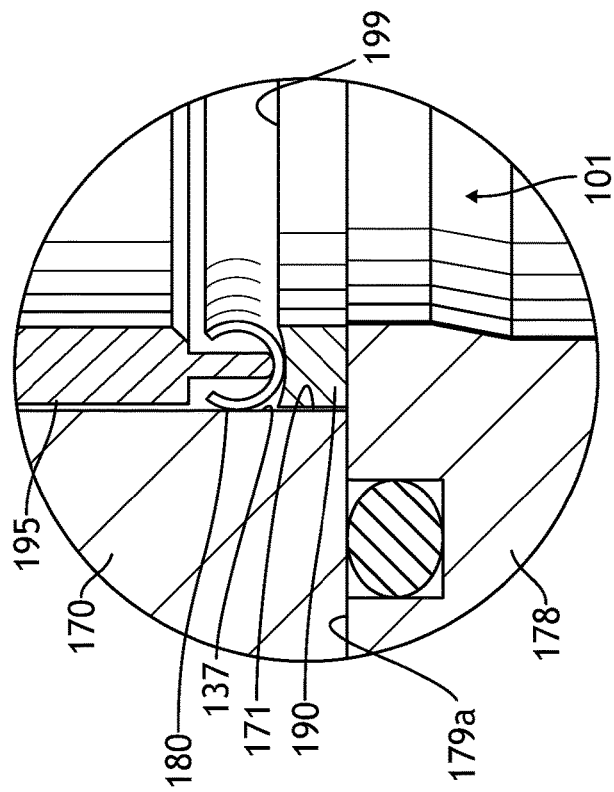
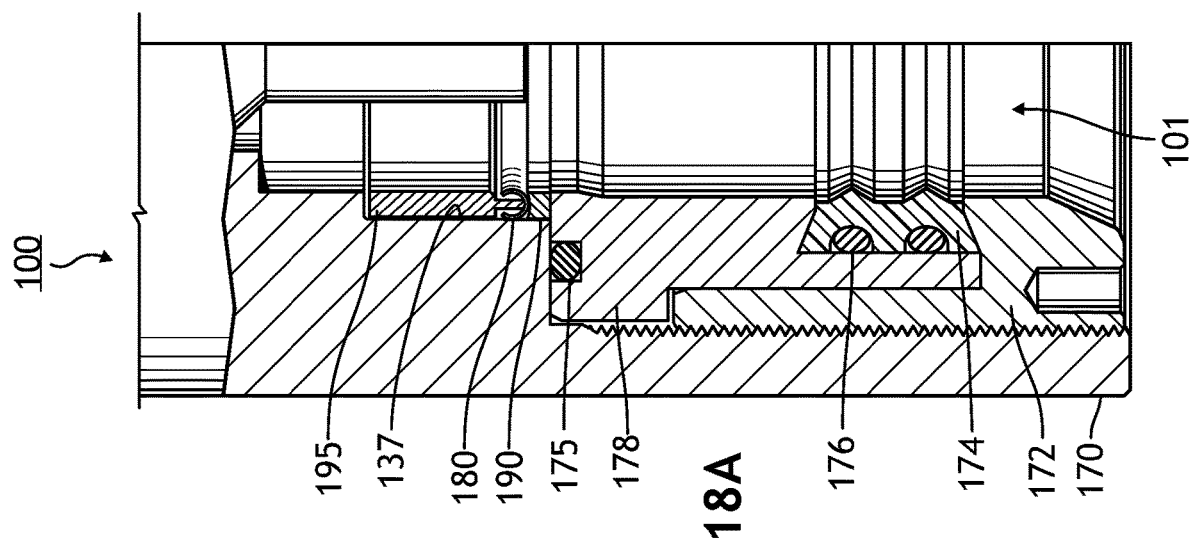

UNDERSEA HYDRAULIC COUPLING WITH MULTIPLE PRESSURE-ENERGIZED METAL SEALS

CROSS-REFERENCE TO RELATED APPLICATIONS

This application is a continuation of U.S. application Ser. No. 16/893,113 filed Jun. 4, 2020, which is a continuation-in-part of U.S. application Ser. No. 16/439,402 filed Jun. 12, 2019, which is a continuation of U.S. application Ser. No. 15/720,663 filed on Sep. 29, 2017, which claims the benefit of U.S. Provisional Application No. 62/404,043 filed on Oct. 4, 2016, the contents of which are each hereby incorporated by reference in their entireties.

BACKGROUND OF THE INVENTION

1. Field of the Invention

This invention relates to hydraulic coupling members. More particularly, it relates to subsea hydraulic couplings having pressure-energized metal seals.

2. Description of the Related Art

A wide variety of undersea hydraulic couplings are available. Some couplings employ metal seals. Examples of undersea hydraulic couplings having metal seals include: U.S. Pat. No. 4,694,859 for "Undersea hydraulic coupling and metal seal;" U.S. Pat. No. 4,817,668 for "Integral metal seal for hydraulic coupling;" U.S. Pat. No. 4,884,584 for "Internally preloaded metal-to-metal seal hydraulic connector;" U.S. Pat. No. 5,029,613 for "Hydraulic coupler with radial metal seal;" U.S. Pat. Nos. 5,099,882 and 5,203,374 for "Pressure balanced hydraulic coupling with metal seals;" U.S. Pat. No. 5,284,183 for "Hydraulic coupler with radial metal seal;" U.S. Pat. No. 5,339,861 for "Hydraulic coupling with hollow metal O-ring seal;" U.S. Pat. No. 5,355,909 for "Undersea hydraulic coupling with metal seals;" U.S. Pat. No. 5,979,499 for "Undersea hydraulic coupling with hollow metal seal;" U.S. Pat. No. 6,962,347 for "Metal backup seal for undersea hydraulic coupling;" U.S. Pat. No. 7,021,677 for "Seal retainer with metal seal members for undersea hydraulic coupling;" U.S. Pat. No. 7,303,194 for "Seal retainer with pressure energized metal seal members for undersea hydraulic coupling;" and, U.S. Pat. No. 7,810,785 for "Undersea hydraulic coupling with hydrostatic pressure energized metal seal," all to Robert E. Smith III and assigned to National Coupling Company (Stafford, Texas).

Other undersea hydraulic couplings employ only "soft seals"—i.e., non-metal seals that are typically formed of an elastomeric polymer ("elastomer") or an engineering plastic capable of being machined such as polyetheretherketone ("PEEK") or DELRIN® acetal resin [E. I. DU PONT DE NEMOURS AND COMPANY, 1007 MARKET ST., WILMINGTON, DELAWARE].

U.S. Pat. No. 6,179,002 discloses an undersea hydraulic coupling having a radial pressure-energized seal with a dovetail interfit with the coupling body. The seal has a pair of flexible sealing surfaces for sealing with the male and female coupling members and a cavity therebetween that is exposed to fluid pressure in the coupling. The outer circumference of the seal has a dovetail interfit between inclined shoulders in the female member bore and on a seal retainer that holds the seal in the bore.

U.S. Pat. No. 6,575,430 discloses an undersea hydraulic coupling member having a ring-shaped seal with multiple sealing surfaces extending radially inwardly therefrom. The multiple sealing surfaces help guide the probe of the male coupling member into the female member without the risk of drag or galling of the receiving chamber. The seal has an interfit with reverse inclined shoulders in the female member to restrain the seal from moving radially inwardly due to vacuum or low pressure. Attention is invited in particular to the embodiments shown in FIGS. 8 and 9 of this patent.

U.S. Pat. No. 6,923,476 discloses a floating seal for an undersea hydraulic coupling member that is moveable radially to seal with the male coupling member even if there is some misalignment with the female coupling member. The floating seal is restricted from axial movement within the female coupling member receiving chamber. The floating seal may seal with the female coupling member.

U.S. Pat. No. 7,575,256 discloses an undersea hydraulic coupling member having a bore liner that protects the coupling members from galling during assembly or disassembly. The bore liner is removable from the bore of a female undersea hydraulic coupling member. The bore liner may be integral with a seal section that may seal with a male undersea hydraulic coupling member. The bore liner also may have an outer diameter configured to engage and interlock with the bore in which the bore liner is positioned. In certain embodiments, the bore liner is fabricated from PEEK.

U.S. Pat. No. 7,163,190 discloses an undersea hydraulic coupling member having a seal retainer with a first inner ring and a second outer ring. The first inner ring and second outer ring are concentric, at least part of the first inner ring inserted through the second outer ring. The second outer ring is threaded to the coupling member to provide sufficient torque to reduce or eliminate any gap between the seal retainer and the shoulder surface in the coupling member on which an elastomeric seal is positioned. Another elastomeric seal is held between the first inner ring and second outer ring of the seal retainer.

U.S. Pat. Nos. 6,983,940 and 7,201,381 to Halling are directed to a resilient, annular, metallic seal member having a generally J-shaped cross-section. The annular, metallic seal member includes a first end portion having a first distal end, a generally curled second end portion that extends to a second distal end, and a central body portion between and contiguous with the first and second end portions. The annular, metallic seal member has a first side and an opposite second side. The second end portion curls in a first direction in accordance with a predetermined radius such that the second, distal end is located across from the first side of the annular, metallic seal member and the first and second distal ends do not face each other.

BRIEF SUMMARY OF THE INVENTION

A female undersea coupling member is equipped with multiple pressure-energized metal seals configured to seal between the body of the female member and the probe of a corresponding male coupling member inserted in the receiving chamber of the female member. The sealing effectiveness of the seal may increase in response to fluid pressure which may be internal fluid pressure or external, ambient pressure.

BRIEF DESCRIPTION OF THE SEVERAL VIEWS OF THE DRAWING(S)

FIG. 3A is a partial cross-sectional view of a female hydraulic coupling member according to an embodiment of the invention having dual pressure-energized metal seals on the seal cartridge and both radial and annular O-ring seals on a split seal retainer.

FIG. 3B is a partial cross-sectional view of a female hydraulic coupling member according to an embodiment of the invention having back-to-back pressure-energized metal probe seals and both radial and annular O-ring seals on a split seal retainer.

FIG. 3C is a partial cross-sectional view of a female hydraulic coupling member according to an embodiment of the invention having pressure-energized metal seals at opposite corners of the seal retainer and a pressure-energized metal probe seal.

FIG. 4A illustrates an alternative embodiment of the female hydraulic coupling member shown in FIG. 3A.

FIG. 4B illustrates an alternative embodiment of the female hydraulic coupling member shown in FIG. 3B.

FIG. 4C illustrates an alternative embodiment of the female hydraulic coupling member shown in FIG. 3C.

FIG. 5A is a partial cross-sectional view of a female hydraulic coupling member according to an embodiment of the invention having a two-piece seal retainer with a radial O-ring seal and back-to-back, pressure-energized metal probe seals.

FIG. 5B is a partial cross-sectional view of a female hydraulic coupling member according to an embodiment of the invention having a two-piece seal retainer with a corner O-ring seal and back-to-back, pressure-energized metal probe seals.

FIG. 5C is a partial cross-sectional view of a female hydraulic coupling member according to an embodiment of the invention having a two-piece seal retainer with an annular O-ring face seal and back-to-back, pressure-energized metal probe seals.

FIG. 6A is a partial cross-sectional view of a female hydraulic coupling member according to an embodiment of the invention having a three-piece seal retainer and both a hydrostatic pressure-energized metal probe seal and a hydraulic fluid pressure-energized metal probe seal.

FIG. 6B is an illustration of an alternative embodiment of the female hydraulic coupling member shown in FIG. 6A.

FIG. 6C is an enlargement of the portion indicated in FIG. 6B.

FIG. 7A is a partial cross-sectional view of a female hydraulic coupling member according to an embodiment of the invention having a two-piece seal retainer with a radial O-ring seal and back-to-back, pressure-energized metal probe seals.

FIG. 7B is an illustration of an alternative embodiment of the female hydraulic coupling member shown in FIG. 7A.

FIG. 7C is an enlargement of the portion indicated in FIG. 7B.

Figure 2:
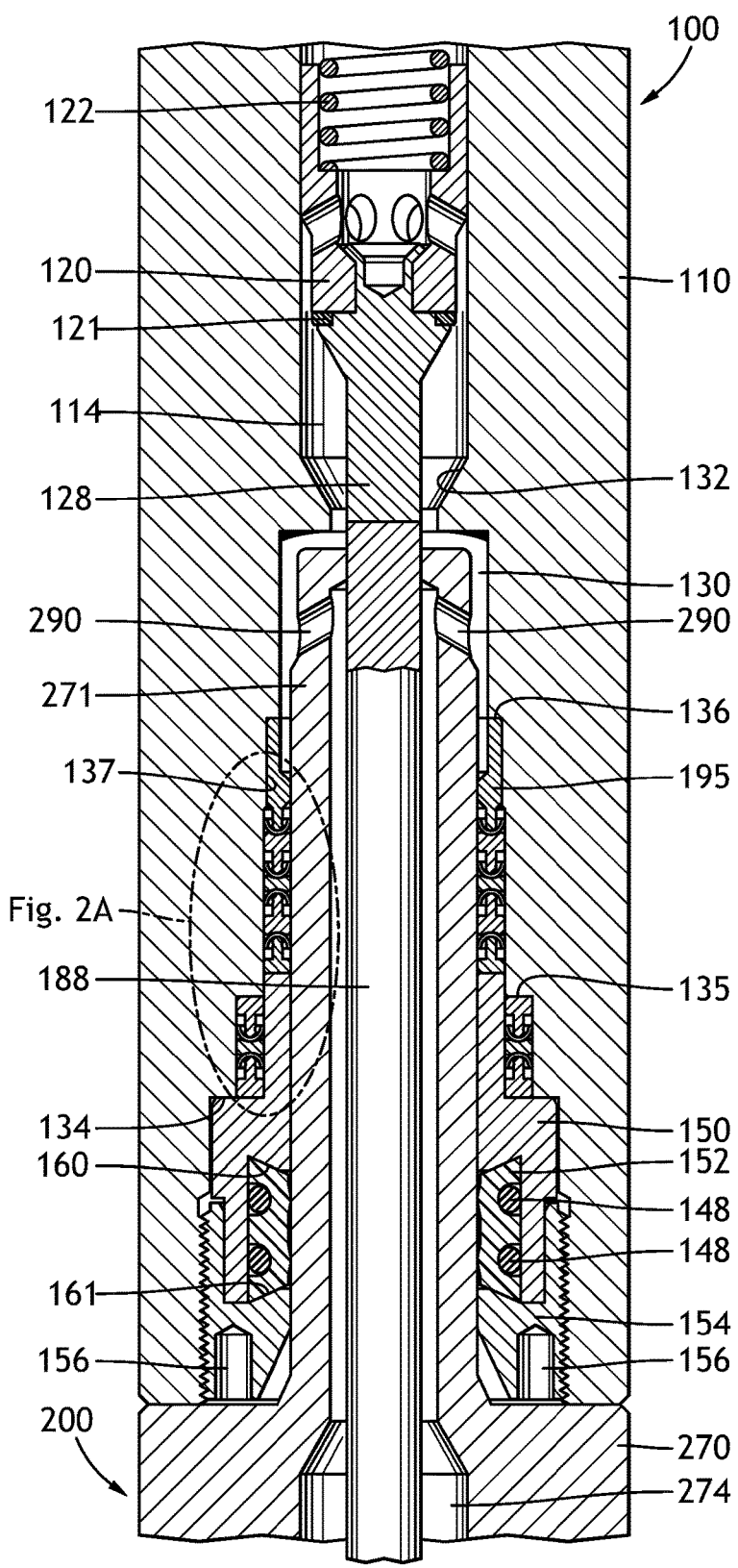
FIG. 2 is a cross-sectional view of the female hydraulic coupling member illustrated in FIG. 1 shown engaged with a corresponding male hydraulic coupling member.
Figure 2A:
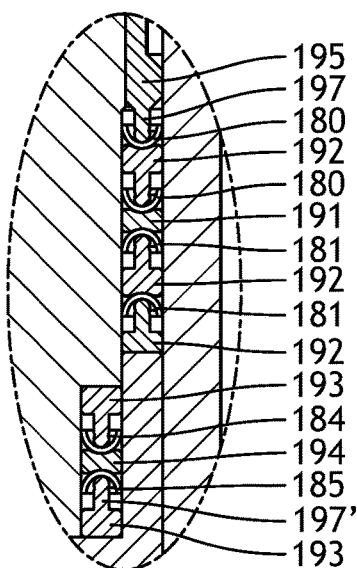
FIG. 2A is an enlarged view of the portion indicated in FIG. 2.

FIGS. 9A-9C contain top plan and cross-sectional views (with dimensions shown in inches) of an alternative embodiment of the seal assembly shown in FIG. 2A.

Figure 10:
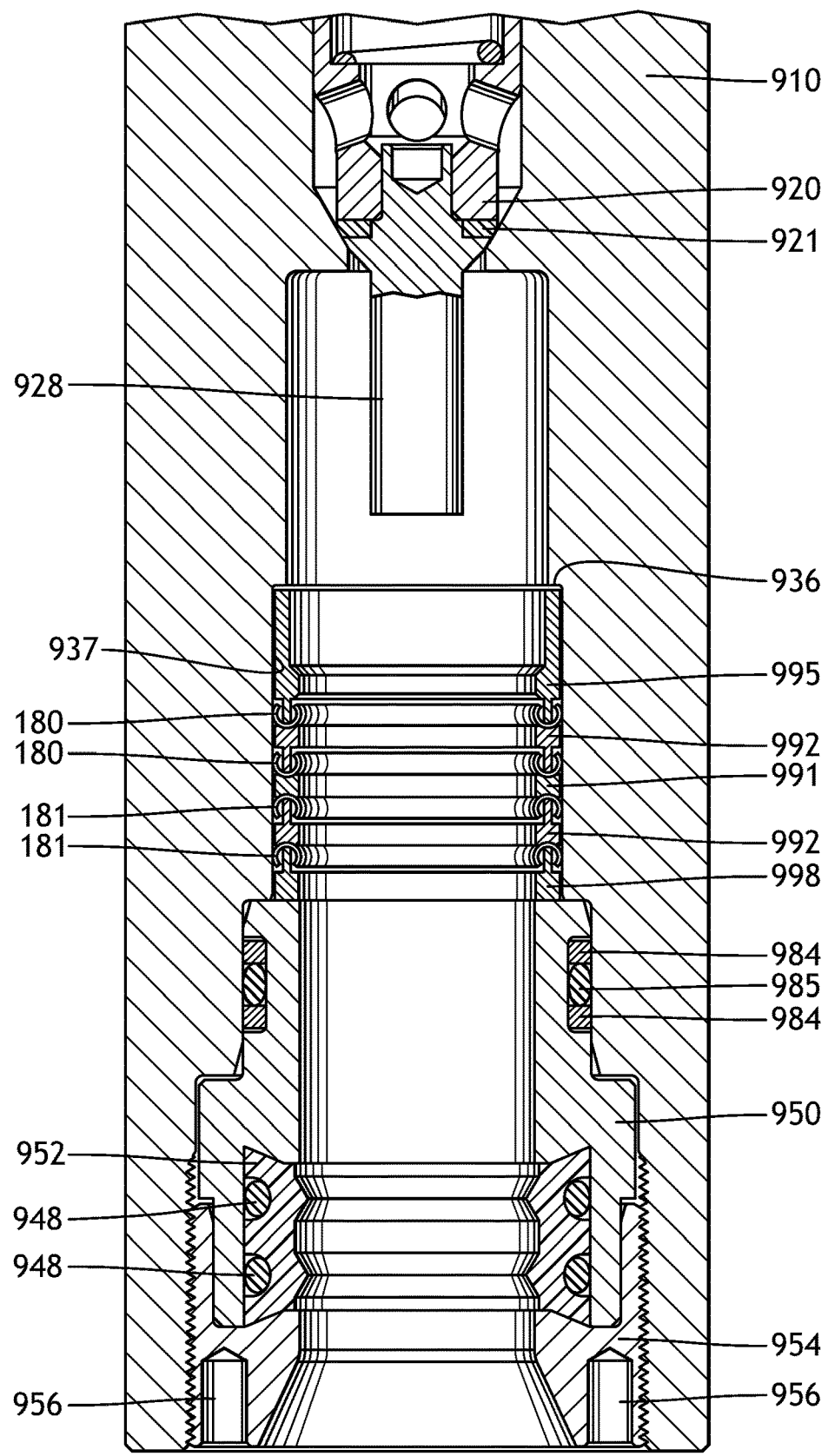

FIG. 10 is a cross-sectional view of a female hydraulic coupling member with a seal assembly according to FIGS. 9A-9C retained in the receiving chamber with a seal cartridge.

FIGS. 11A-11B contain top plan and cross-sectional views (with dimensions shown in inches) of a particular seal assembly according to an embodiment of the invention having three pressure-energized metal seals configured for energization by hydraulic fluid within a coupling member.

Figure 12A:
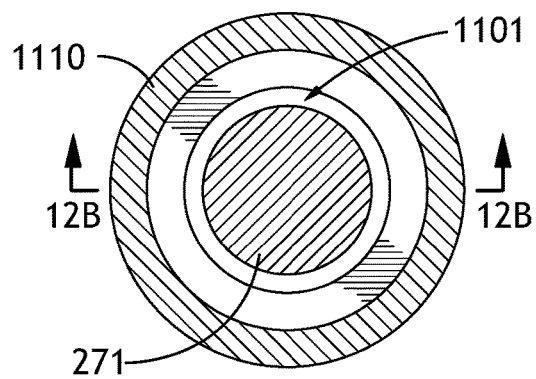
Figure 12B:
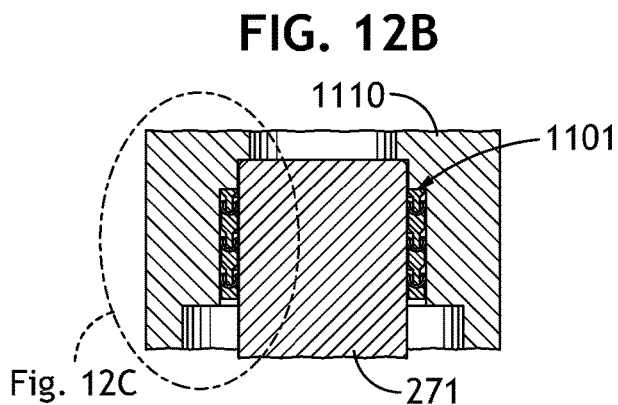
Figure 12C:
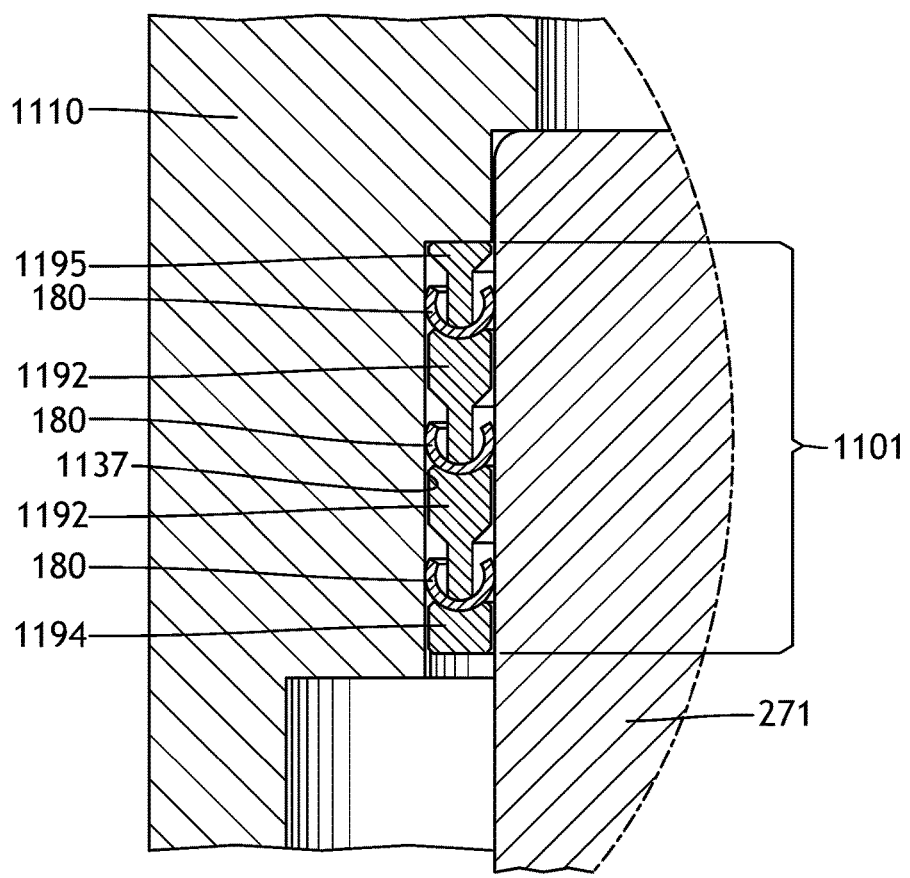

FIG. 12A is a top view and FIGS. 12B-12C are cross-sectional views of the seal assembly of FIGS. 11A-11B installed in a female hydraulic coupling member with the probe of a corresponding male hydraulic coupling member inserted therein.

Figure 13:
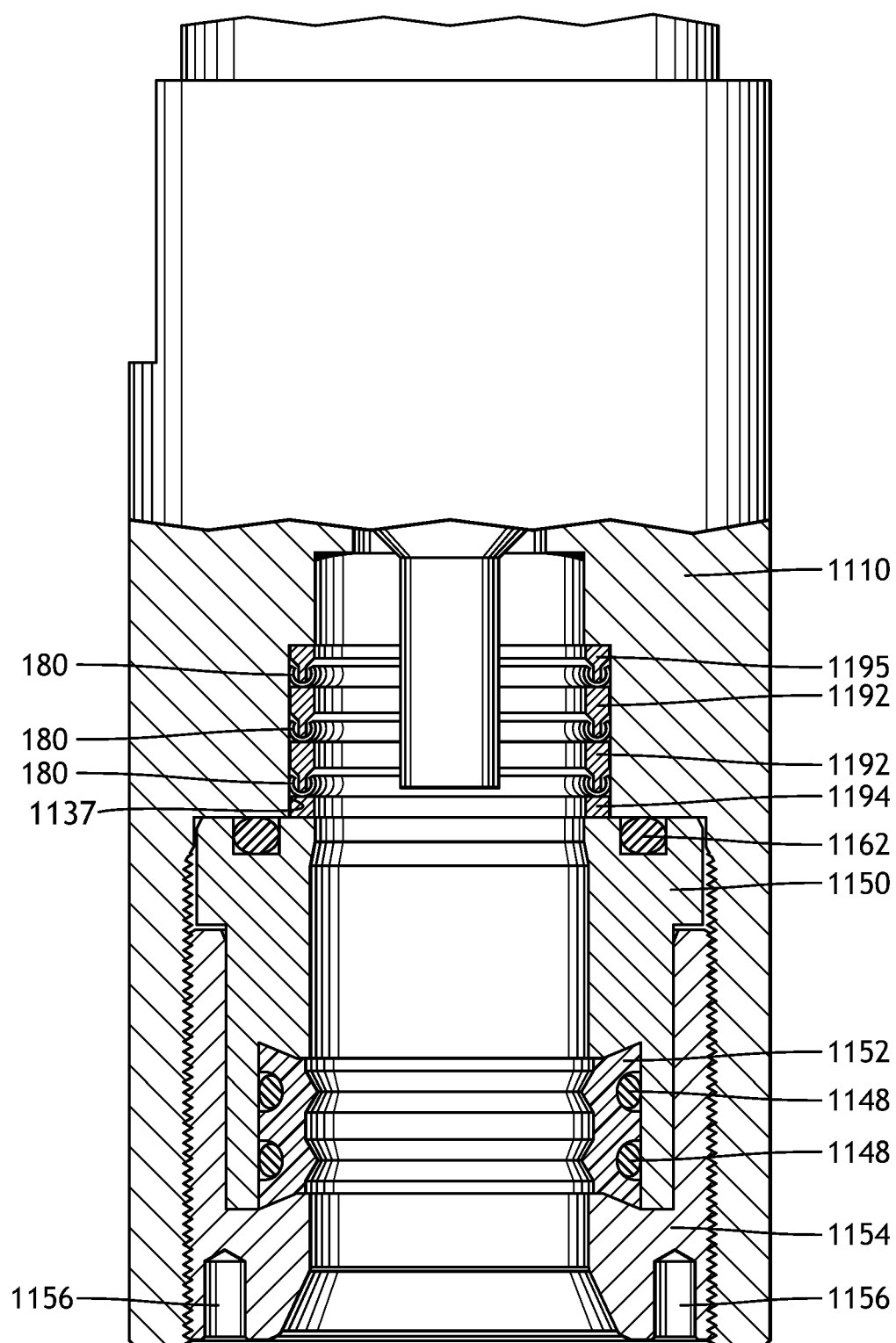

FIG. 13 is a cross-sectional view of a female hydraulic coupling member with a seal assembly according to FIG. 11A-11B retained in the receiving chamber with a seal cartridge.

Figure 14A:
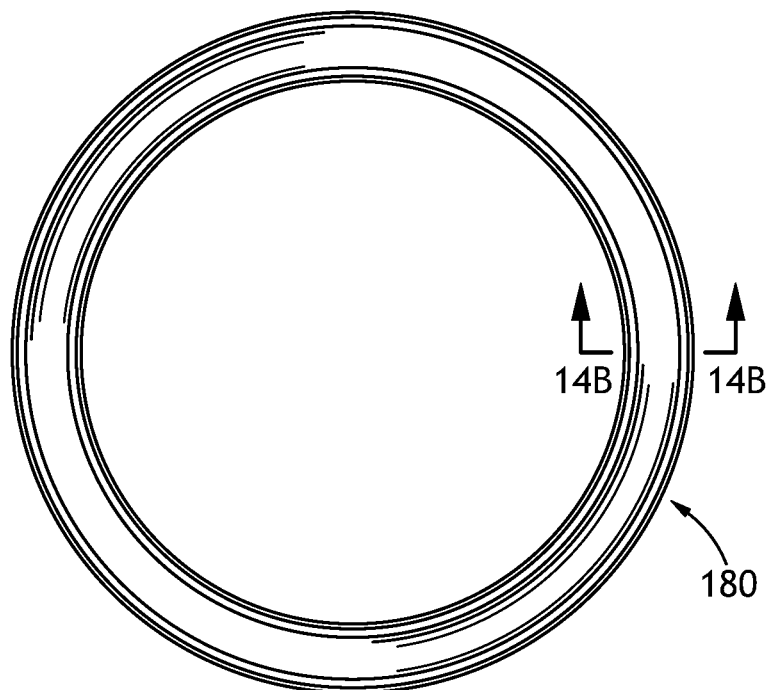
Figure 14B:
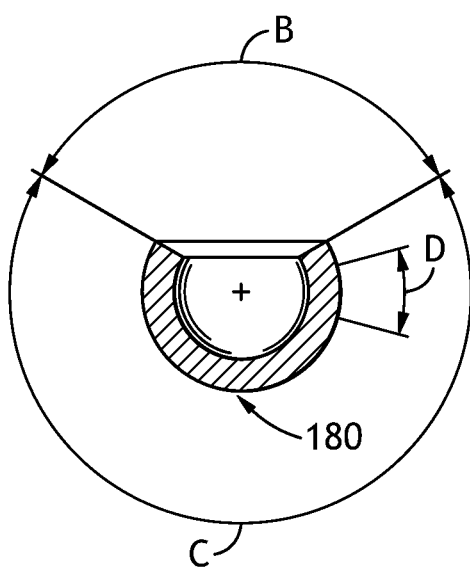

FIGS. 14A-14B contain a top plan view and a cross-sectional view of a representative metal C-seal of the prior art.

FIGS. 15A-15B illustrate a cross-sectional view and a detailed view of a female hydraulic coupling having another seal stack according to the present disclosure.

FIGS. 16A-16B illustrate a cross-sectional view and a detailed view of a female hydraulic coupling having another seal arrangement according to the present disclosure.

FIG. 16C illustrates portion of the female hydraulic coupling in FIG. 16A having the probe of the male member inserted.

Figure 17A:
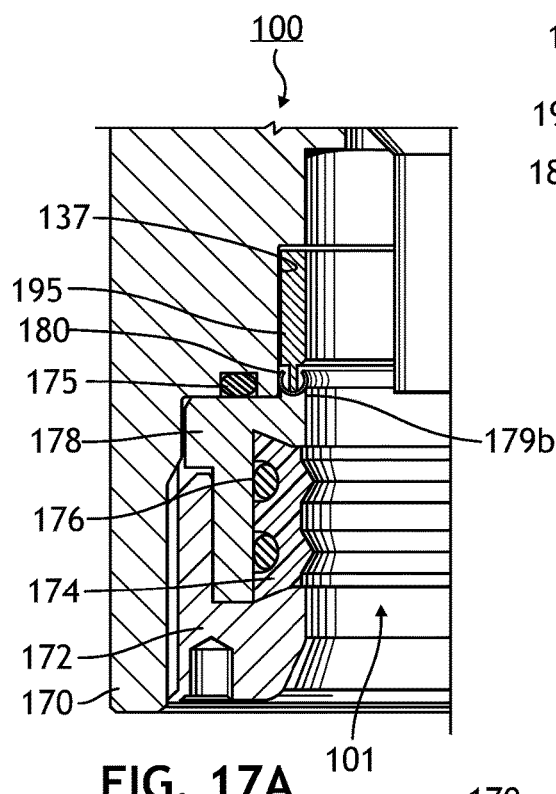
Figure 17B:
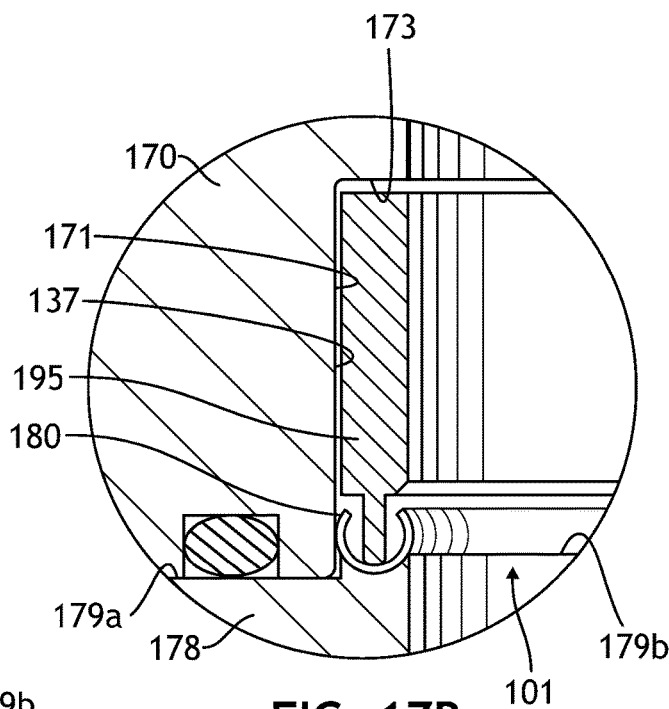

FIGS. 17A-17B illustrate a cross-sectional view and a detailed view of a female hydraulic coupling having a seal stack according to the present disclosure.

Figure 17C:
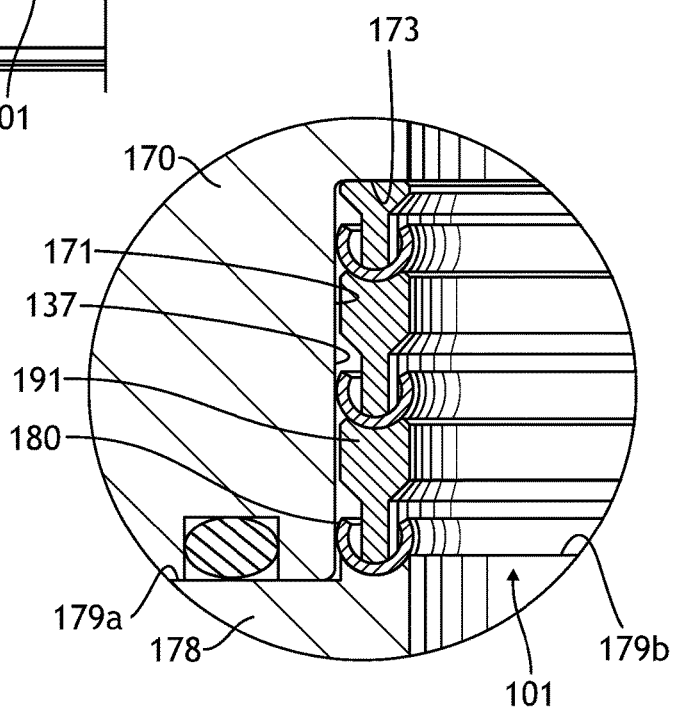

FIG. 17C illustrates a detailed view of the female hydraulic coupling in FIGS. 17A-17B having additional seal stacks according to the present disclosure.

FIGS. 18A-18B illustrate a cross-sectional view and a detailed view of a female hydraulic coupling having yet another seal arrangement according to the present disclosure.

DETAILED DESCRIPTION OF THE INVENTION

The invention may best be understood by reference to various illustrative embodiments of the invention. In the illustrated embodiments, the two least significant digits of the figure element numbers are used to denote similar or corresponding elements.

Figure 1:
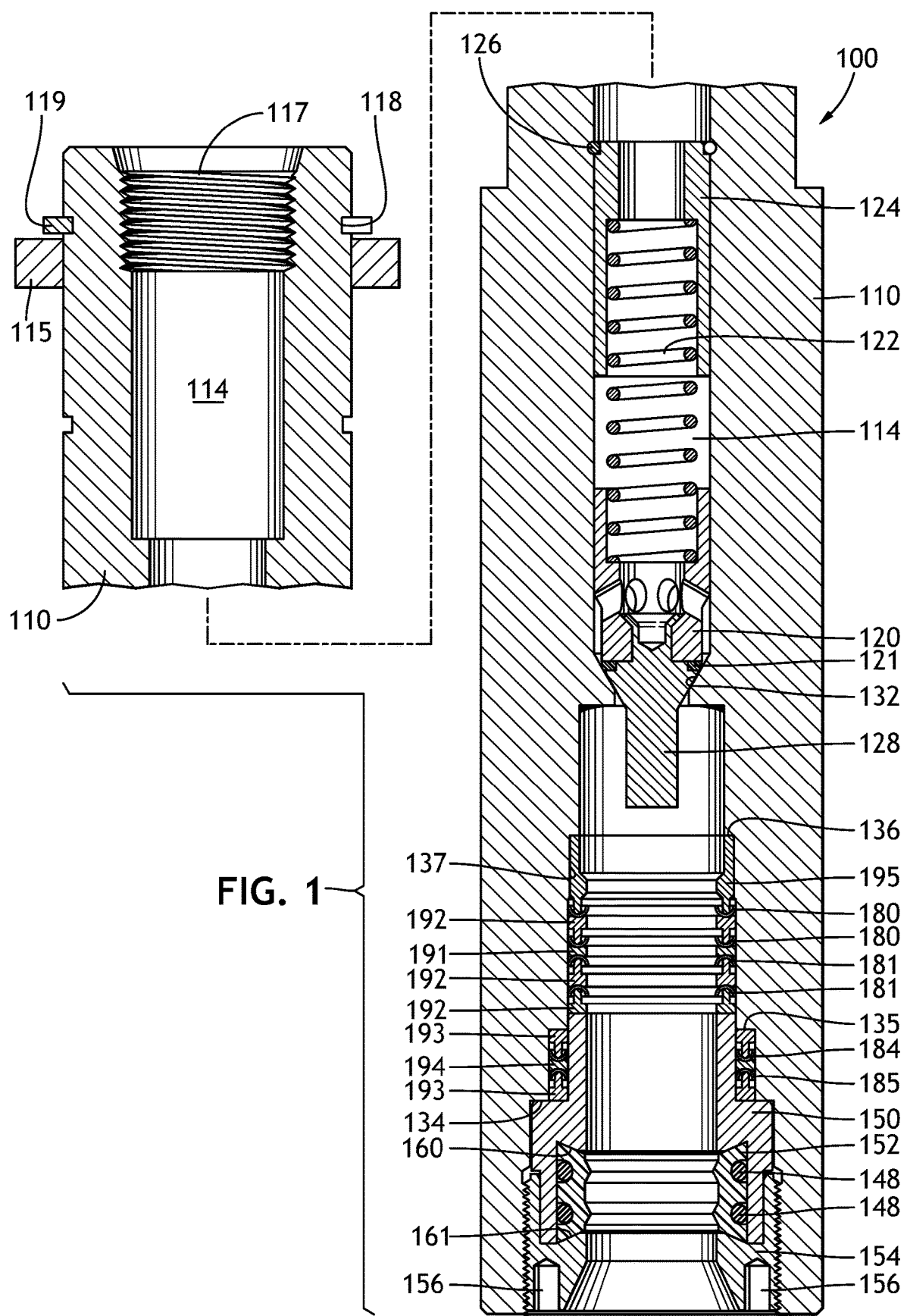
FIG. 1 is a cross-sectional view of a female hydraulic coupling member according to one embodiment of the invention.

FIG. 1 shows an illustrative example of a female hydraulic coupling member 100 according to one embodiment of the invention. FIG. 2 shows the same female hydraulic coupling member 100 with a probe section 271 of a corresponding male hydraulic coupling member 200 seated in the receiving chamber of female member 100.

Female hydraulic coupling member 100 comprises generally cylindrical body 110 which may have one or more wrench flats (not shown) on its external surface for engaging a tool for rotating body 110 about its longitudinal axis (or for preventing the rotation of body 110 about its longitudinal axis when a hydraulic line is connected thereto at internally threaded connection portion 117 of central axial bore 114).

Keeper 119 in external circumferential groove 118 may be provided to secure female coupling member 100 in manifold plate 115.

Optional poppet valve 120 may seal against frusto-conical poppet valve seat 132 in central axial bore 114 with poppet seal 121 which is urged into sealing engagement with frusto-conical poppet valve seat 132 by poppet spring 122 acting against poppet spring seat 124 which may be secured in central axial bore with keeper 126 in a groove in the wall of central axial bore 114. Optional poppet valve 120 may be moved to the open position by axial force acting on poppet actuator 128. Poppet valve 120 is illustrated in the open position in FIG. 2 wherein male poppet valve actuator 188 has moved female poppet valve actuator 128 in the upward direction in FIG. 2.

Body 110 has a central, axial bore 114 which may have a varying internal diameter. One end of the central axial bore 114 may comprise internally-threaded connector 117 for attaching the female coupling to a hydraulic line, conduit, pipe nipple or the like. Various means well known in the art (such as external circumferential groove 118) may be provided for mounting the female coupling member in a manifold plate or the like.

Also shown in FIG. 2 is corresponding male hydraulic coupling member 200 which comprises generally cylindrical body 270 which may have one or more wrench flats (not shown) on its external surface for engaging a tool for rotating body 270 about its longitudinal axis.

Body 270 has a central, axial bore 274 which may have a varying internal diameter.

One end of male body 270 comprises male probe 271 of reduced external diameter for insertion into the receiving chamber of the female hydraulic coupling member. In the embodiment shown in FIG. 2, probe 71 is provided with anti-fouling flow ports 290 in its side wall. It is common for undersea male hydraulic coupling members to be mounted in a vertical orientation and it has been found that if radial flow ports are provided on the male probe which are angled in the downward direction, the male coupling member is less likely to become fouled by marine sediment falling towards the seafloor. In order to accommodate a male member having such anti-fouling flow ports, bore 114 of the female member may include annular flow channel 130. It will be appreciated, however, that the invention may also be used with coupling members designed for conventional male probes having axial flow ports.

To provide a fluid-tight seal between the probe 271 of male member 200 and the receiving chamber of the female member 100, the female member may comprise a plurality of sealing elements. The illustrated embodiment comprises a seal cartridge which contains a number of seals and acts to retain other seals in the body of the female hydraulic coupling member. The seal cartridge may comprise a generally cylindrical sleeve 150 which is at least partially inserted into outer shell 154 which has an externally-threaded portion for engaging the bore 114 of female body 110. Sleeve 150 and shell 154 may have an interference fit such that withdrawal of shell 154 from body 110 effects removal of the entire seal cartridge. Spanner engagement holes 156 may be provided in shell 154 to allow an appropriate tool to be used to insert and/or remove the seal cartridge (comprised of elements 150, 152 and 154) as a unit.

Sleeve 150 may have angled shoulder 160 for engaging crown seal 152 which may have a correspondingly angled end to resist radial movement into the receiving chamber under the influence of negative pressure such as may occur during withdrawal of the male probe. Outer shell 154 of the seal cartridge may have angled shoulder 161 to likewise engage the opposing end of crown seal 152.

In the embodiment illustrated in FIGS. 1 and 2, probe seal 152 is a double crown seal and includes optional circumferential O-ring seals 148 for sealing between crown seal 152 and seal cartridge sleeve 150. In one particular preferred embodiment, crown seal 152 is machined from polyetheretherketone (PEEK) polymer which has been found to provide sealing effectiveness between the probe sections of male hydraulic coupling members and the receiving chambers of female hydraulic coupling members. Other materials suitable for probe seals are well-known in the art.

In the embodiment illustrated in FIGS. 1 and 2, sections of differing inside diameter (i.d.) within central axial bore 114 are divided by internal shoulders 134, 135, and 136.

Pressure-energized metal C-seals 180 and 181 are retained in a cylindrical recess 137 between internal shoulder 136 and retainer 150, and the C-seals 180 and 181 provide a seal between the body of the female coupling member and the probe of a male coupling member inserted into the receiving chamber of the female member. Shoulder spacer 195 has a first end which bears against internal shoulder 136 and an opposing second end having projection 197 which fits within, supports, and retains the innermost metal C-seal 180. The end of projection 197 which fits within the C-seal may be rounded to conform to the curvature of the wall of hollow metal C-seal 180. Pressure-energized metal seal supports 192 have a generally T-shaped cross section with the leg of the T forming a projection similar to projection 197 on shoulder spacer 195. The distal end of the projection may be rounded to conform to the curvature of the wall of hollow metal C-seal 180. Spacer ring 191 may be used to separate back-to-back C-seals 180 and 181. As illustrated, a plurality of pressure-energized metal C-seals 181 may be separated and supported on T-shaped, pressure-energized metal seal supports 192. Metal seal supports 192, spacer rings 191, and shoulder spacers 195 may be fabricated of INCONEL® alloy 718 [HUNTINGTON ALLOYS CORPORATION, 3200 RIVERSIDE DRIVE, HUNTINGTON, WEST VIRGINIA 25705] or any other suitable material and, in certain embodiments, may be plated (e.g. gold plated) to reduce galling.

In the embodiment illustrated in FIGS. 1 and 2, the inward seal stacks (180, 192, 195) are arranged opposite the outward seal stacks (181, 192) on both sides of the spacer ring 191. In this way, pressure-energized metal C-seals 180 are oriented so as to be energized by hydraulic fluid pressure within the coupling member. Pressure-energized metal C-seals 181 are oriented so as to be energized by hydrostatic fluid pressure from outside the coupling member. It will be appreciated by those skilled in the art that C-seals 180 and 181 may be orientated as desired to provide increased sealing effectiveness for either internal hydraulic fluid or seawater. Subject only to space limitations within the body of the female coupling member, there may be any number of hydraulic fluid-energized C-seals and any number of hydrostatic head-energized C-seals.

Pressure-energized metal C-seals 184 and 185 are retained on internal shoulder 135 and provide a seal between the body of the female coupling member and sleeve 150 of the seal cartridge. Pressure-energized C-seal supports 193 have a generally T-shaped cross section with the leg of the T forming a projection 197' which fits within, supports, and retains metal C-seal 184 or 185 as the case may be. The distal end of the projection may be rounded to conform to the curvature of the wall of hollow metal C-seal 184 or 185. Spacer ring 194 may be used to separate back-to-back C-seals 184 and 185. As illustrated, a plurality of pressure-energized metal C-seals 184 and/or 185 may be separated and supported on T-shaped, pressure-energized metal seal supports 193.

In the embodiment illustrated in FIGS. 1 and 2, the inward seal stack (184, 193) is arranged opposite the outward seal stack (185, 193) on both sides of the spacer ring 194. In this way, pressure-energized metal C-seal 184 is oriented so as to be energized by hydraulic fluid pressure within the coupling member. Pressure-energized metal C-seals 185 are oriented so as to be energized by hydrostatic fluid pressure from outside the coupling member. It will be appreciated by those skilled in the art that C-seals 184 and 185 may be orientated as desired to provide increased sealing effectiveness for either internal hydraulic fluid or seawater. Subject only to space limitations within the body of the female coupling member, there may be any number of hydraulic fluid-energized C-seals and any number of hydrostatic head-energized C-seals.

Figure 2B:
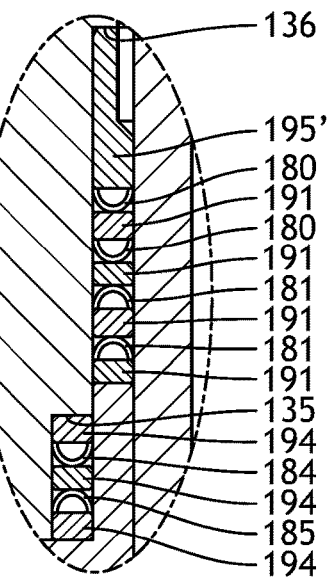
FIG. 2B is an enlarged view of the portion indicated in FIG. 2 showing an alternative form of seal spacers between the pressure-energized metal seals.

An alternative embodiment having different spacers for the pressure-energized metal C-seals is illustrated in FIG. 2B. Shoulder spacer 195' and spacer rings (smaller i.d.) 191 and spacer rings (larger i.d.) 194 are generally rectangular in cross section and do not have the projections 197 of shoulder spacer 195 and T-shaped pressure-energized C-seal supports 192 and 193 that extend into the internal cavity of hollow metal C-seals 180, 181, 184 and 185.

Spacer ring (smaller i.d.) 191, T-shaped pressure-energized metal seal supports (smaller o.d.) 192, T-shaped pressure-energized metal seal supports (larger o.d.) 193, spacer ring (larger i.d.) 194, and shoulder spacer 195 may be made of any suitable material. Examples of suitable materials include metal (which may be a metal softer than the metal of the male probe member so as to prevent galling), polymers, and engineering plastics such as PEEK and DELRIN® [E. I. DU PONT DE NEMOURS AND COMPANY, WILMINGTON, DELAWARE].

For clarity of illustration, the pressure energized metal C-seals shown in the illustrated embodiments are semi-circular in cross section. It should be understood that hollow, pressure-energized metal C-seals having cross sections of more than 180 degrees are commercially available and may be substituted for the "half-circle" C-seals shown in the drawing figures. Various suitable pressure-energized metal C-seals are available from American Seal and Engineering Company, Inc. (Orange, Connecticut).

FIG. 3A illustrates an embodiment of the invention having a crown seal 352 retained by an inner seal retainer 344 and an outer seal retainer which is a part of a seal cartridge comprised of outer shell 354 which has an interference fit with outer seal retainer 345. O-ring face seals 362 are provided in concentric annular grooves on the inner end of inner seal retainer 344. O-ring seal 340' is provided in a circumferential groove in the outer wall of inner seal retainer 344. O-ring seal 340 is provided in a circumferential groove in the outer wall of outer seal retainer 345. Inner seal retainer 344 has angled shoulder 360 and outer seal retainer 345 has angled shoulder 361 which engage corresponding angled ends of crown seal 352 so as to provide a dovetail interfit that resists implosion of crown seal 352 in negative-pressure situations such as may occur upon withdrawal of the male probe from the receiving chamber of female coupling member 300.

Pressure-energized metal C-seal 380 in cylindrical recess 337 is retained on internal shoulder 335 by inner seal retainer 344. (As shown here, the C-seal 380 can have its convex side disposed adjacent the flat surface of the internal shoulder 335. As described below with reference to FIGS. 16A-16C and 17A-17C, the internal shoulder 335 of the retainer 344 may be contoured to fit the abutting convex surface of the C-seal 380 not unlike the contours provided in the spacers 191, 194 described previously.) Pressure-energized metal C-seal 380 provides a seal between the male probe member and body 310 of female member 300 that is energized by internal hydraulic fluid pressure.

Pressure-energized metal C-seal 381 is retained on shoulder 336 of outer seal retainer 345 by outer cartridge 354. Pressure-energized metal C-seal 380 provides a seal between the male probe member and body 310 of female member 300 that is energized by hydrostatic fluid pressure.

Pressure-energized metal C-seal 385 is retained on shoulder 336 of outer seal retainer 345 by outer cartridge 354. Pressure-energized metal C-seal 385 provides a seal between inner seal retainer 345 and outer shell 354 that is energized by hydrostatic fluid pressure.

The embodiment illustrated in FIG. 3B is similar to that of FIG. 3A but pressure-energized metal C-seal 385 is replaced with annular O-ring face seal 362' and a single annular O-ring face seal 362 is provided on the inner end of inner seal retainer 344'. Pressure-energized metal C-seals 381 and 381 are provided in back-to-back arrangement on internal shoulder 335' in the central axial bore of body 311. Pressure-energized metal C-seals 380 and 381 are separated by split-ring spacer 396 which may be a metal spacer in an undercut groove in the outer wall of shoulder 335'. Inner and outer seal retainers 344' and 345' are secured by retainer locking member 342.

Another embodiment of the invention is illustrated in FIG. 3C. This embodiment has one-piece inner seal retainer 346 with an angled internal shoulder and a retainer locking member 342 with a complimentary angled internal shoulder. Dovetail probe seal 338 has an interfit with the angled shoulders on retainer locking member 342 and inner seal retainer 346 that resists implosion of probe seal 338 in negative-pressure situations such as may occur upon withdrawal of the male probe from the receiving chamber of female coupling member 302. Probe seal 338 is described in U.S. Pat. No. 5,052,439, the contents of which are hereby incorporated by reference in their entirety.

Pressure-energized metal C-seals 384 and 384' are provided in grooves at the opposing, outside corners of seal retainer 346 to provide a fluid-tight seal between seal retainer 346 and body 310 of female coupling 302. In the illustrated embodiment, pressure-energized metal C-seals 384 and 384' are both oriented so as to be pressure energized by internal hydraulic fluid pressure. It should be understood that either or both of pressure-energized metal C-seals 384 and 384' may be oriented so as to be pressure-energized by hydrostatic fluid pressure.

FIGS. 4A, 4B, and 4C illustrate embodiments of the invention that correspond generally to the embodiments illustrated in FIGS. 3A, 3B, and 3C, respectively. Corresponding components have similar reference numerals in the 400's. In the FIG. 4 embodiments, expansion gaps 472 and 472' are provided to accommodate the expansion in the axial direction (of female hydraulic coupling members 400, 401, and 402) of pressure-energized metal C-seal 480 and 481, when they are mechanically compressed in the radial direction by contact with the probe of a male hydraulic coupling member inserted in the receiving chamber of the female hydraulic coupling member. (Instead of the expansion gap 472 shown here, the internal shoulder of the retainer 444 may be contoured to fit the abutting convex surface of the C-seal 480 not unlike the contours provided in the various spacers described previously and as further described below with reference to FIGS. 16A-16C and 17A-17C.) Similarly, expansion gaps 472" may be provided to accommodate the expansion in the axial direction (of female hydraulic coupling members 400, 401, and 402) of pressure-energized metal C-seals 484, 484' and 485 when they are mechanically compressed in the radial direction by insertion of seal retainer 446 or the insertion of outer seal retainer 445 into outer shell 454 of the seal cartridge (454+445) of female coupling member 400.

FIGS. 5A, 5B, and 5C illustrate variations on an embodiment of the invention having back-to-back pressure-energized metal C-seals 580 and 581 separated by spacer ring 594 which may be a metal spacer ring. Corresponding components have similar reference numerals in the 500's. Pressure-energized metal C-seal 580 provides a seal between the probe section of a male coupling member inserted in the receiving chamber of female hydraulic coupling member 500, 501, or 502 and the body 510 of the female coupling member. Pressure-energized metal C-seal 581 provides a seal between the probe section of a male coupling member inserted in the receiving chamber of female hydraulic coupling member 500, 501, or 502 and seal retainer 546. In the illustrated embodiments, pressure-energized metal C-seal 580 is oriented so as to be energized by internal hydraulic fluid pressure and pressure-energized metal C-seal 581 is oriented so as to be energized by the hydrostatic pressure of the seawater. It should be appreciated that pressure-energized metal C-seal 580 and 581 may be independently oriented as desired to provide pressure energization by either internal hydraulic fluid pressure or hydrostatic ambient pressure.

In FIG. 5A, female hydraulic coupling member 500 has radial O-ring seal 540 in a circumferential groove in the outer wall of seal retainer 546 for providing a seal between seal retainer 546 and body 510.

In FIG. 5B, female hydraulic coupling member 501 has corner O-ring seal 564 in an outside corner groove in the outer wall of seal retainer 546' for providing a seal between seal retainer 546' and body 510.

In FIG. 5C, female hydraulic coupling member 502 has O-ring face seal 562 in an annular groove in the bottom end of seal retainer 546" for providing a seal between seal retainer 546" and body 510.

The embodiment illustrated in FIG. 6A has a two-piece seal retainer comprised of inner seal retainer 644 and outer seal retainer 645 both secured in body 610 of hydraulic coupling member 600 by retainer locking member 642. Angled shoulder 660 on inner seal retainer 644 and angled shoulder 661 on outer seal retainer 645 provide a dovetail interfit for probe seal 638 that resists implosion of probe seal 638 in negative-pressure situations such as may occur upon withdrawal of the male probe from the receiving chamber of female coupling member 600. Annular O-ring face seal 662 seals between inner seal retainer 644 and coupling body 610. Annular O-ring face seal 662' seals between inner seal retainer 644 and outer seal retainer 645. Annular O-ring face seal 662" seals between outer seal retainer 645 and retainer locking member 642.

Pressure-energized metal C-seal 680 is a probe seal secured in cylindrical recess 637 on shoulder 635 by inner seal retainer 644. (As shown here in FIG. 6A, the C-seal 680 can have its convex side disposed adjacent the flat surface of the internal shoulder 635. As described below with reference to FIGS. 16A-16C and 17A-17C, the internal shoulder 635 of the retainer 644 may be contoured to fit the abutting convex surface of the C-seal 680 not unlike the contours provided in various spacers described previously.) Pressure-energized metal C-seal 681 is a probe seal secured on shoulder 636 on outer sealer retainer 645. In the illustrated embodiment, pressure-energized metal C-seal 680 is oriented so as to be energized by internal hydraulic fluid pressure and pressure-energized metal C-seal 681 is oriented so as to be energized by the hydrostatic pressure of the seawater. It should be appreciated that pressure-energized metal C-seal 680 and 681 may be independently oriented as desired to provide pressure energization by either internal hydraulic fluid pressure or hydrostatic ambient pressure.

FIGS. 6B and 6C illustrate an alternative embodiment having expansion gaps 672. Expansion gaps 672 and 672' may be provided to accommodate the expansion in the axial direction (of female hydraulic coupling member 601) of pressure-energized metal C-seal 680 and 681, when they are mechanically compressed in the radial direction by contact with the probe of a male hydraulic coupling member inserted in the receiving chamber of female hydraulic coupling member 601. As may best be seen in FIG. 6C, expansion gap 672 may be created by providing a shoulder on the inner end of inner seal retainer 644. In this way, expansion gap 672 may be retrofitted to female coupling member 600. Alternatively, expansion gap 672 may be created by increasing the depth of shoulder 635 in female hydraulic coupling member 600.

Female hydraulic coupling member 700 shown in FIG. 7A is generally similar to female hydraulic coupling member 600 but has one-piece seal retainer 746 with straight shoulder 736 on the inner end thereof and angled shoulder 760 on the opposing end thereof. Retainer locking member 742 has angled shoulder 761 on its inner end. Angled shoulders 760 and 761 provide a dovetail interfit for probe seal 738 that resists implosion of probe seal 738 in negative-pressure situations such as may occur upon withdrawal of the male probe from the receiving chamber of female coupling member 700. Circumferential O-ring seal 740 provides a seal between seal retainer 746 and body 710 of female hydraulic coupling member 700.

Back-to-back pressure-energized metal C-seal 780 and 782 are retained in cylindrical recess 737 on shoulders 735 and 736, respectively, and are separated by spacer ring 794 which may be a metal spacer ring. It should be noted that pressure-energized metal C-seal 782 has a larger outside diameter (o.d.) than pressure-energized metal C-seal 780 due to the greater width of shoulder 736 (as compared to shoulder 735). In the illustrated embodiment, pressure-energized metal C-seal 780 is oriented so as to be energized by internal hydraulic fluid pressure and pressure-energized metal C-seal 782 is oriented so as to be energized by the hydrostatic pressure of the seawater. It should be appreciated that pressure-energized metal C-seals 780 and 782 may be independently oriented as desired to provide pressure energization by either internal hydraulic fluid pressure or hydrostatic ambient pressure.

An alternative embodiment is shown in FIGS. 7B and 7C. In this embodiment, expansion gaps 772 and 772' are provided to accommodate the expansion in the axial direction (of female hydraulic coupling member 701) of pressure-energized metal C-seal 780 and 782, when they are mechanically compressed in the radial direction by contact with the probe of a male hydraulic coupling member inserted in the receiving chamber of female hydraulic coupling member. Expansion gaps 772 and 772' may be provided by decreasing the axial dimension of spacer ring 794 (to create spacer ring 794'). Alternatively, expansion gaps 772 and 772' may be provided by increasing the depth of shoulder 735 and/or the depth of shoulder 736. As may best be seen in FIG. 7C, the axial ends of spacer ring 794' may be contoured to match the curvatures of pressure-energized metal C-seal 780 and 782. Spacer rings 794 and/or 794' may be provided with a section of larger o.d. that fits against the radial wall of shoulder 736 and an adjoining section of smaller o.d. that fits against the radial wall of shoulder 735. In this way, the axial position of spacer ring 794 within the central axial bore of body 710 may be more precisely controlled.

Figure 8C:
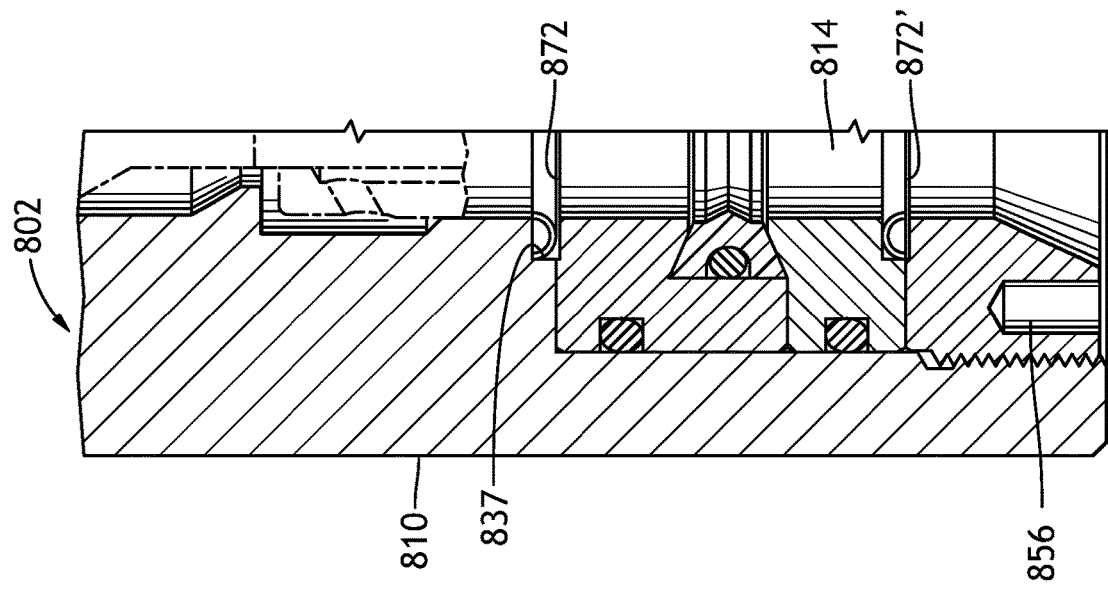
FIG. 8C is an illustration of an alternative embodiment of the female hydraulic coupling member shown in FIG. 8B.
Figure 8B:
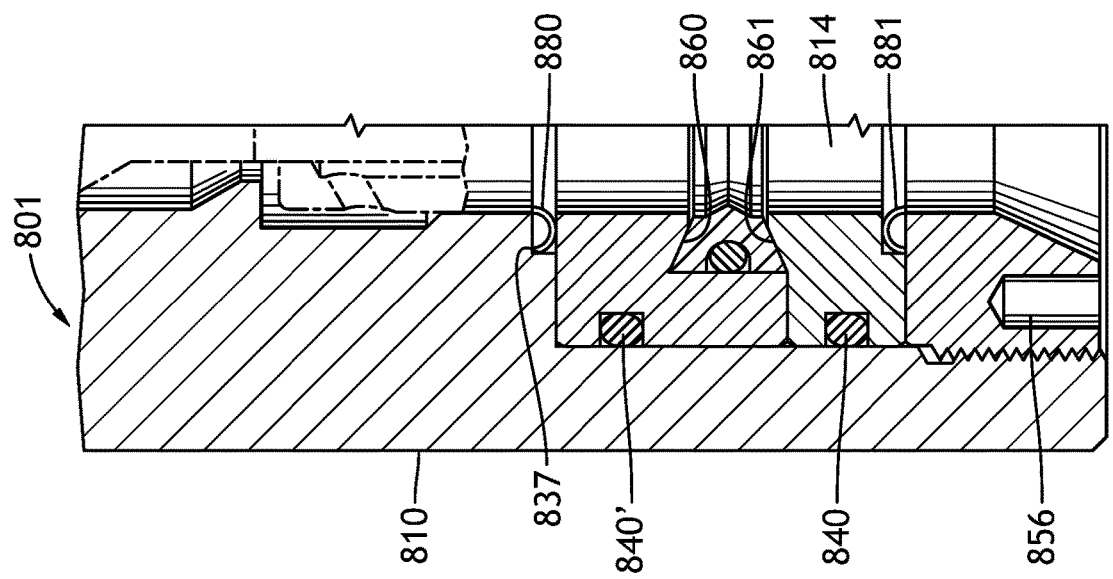
FIG. 8B is a partial cross-sectional view of a female hydraulic coupling member according to an embodiment of the invention having a three-piece seal retainer with a radial O-ring seal and both a hydrostatic pressure-energized metal probe seal and a hydraulic fluid pressure-energized metal probe seal.
Figure 8A:
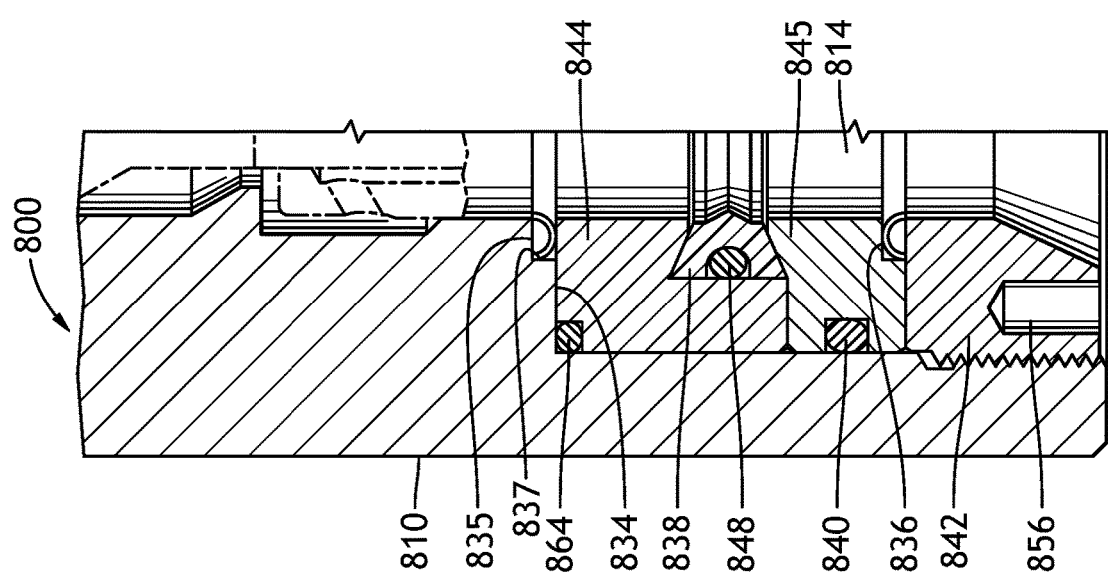
FIG. 8A is a partial cross-sectional view of a female hydraulic coupling member according to an embodiment of the invention having a three-piece seal retainer with a corner-mounted O-ring seal and both a hydrostatic pressure-energized metal probe seal and a hydraulic fluid pressure-energized metal probe seal.

FIGS. 8A, 8B, and 8C illustrate an embodiment of the invention having a two-piece seal retainer comprised essentially of inner seal retainer 844 seated on shoulder 834 in the central axial bore of body 810 of female hydraulic coupling member 800 and outer seal retainer 845 both secured in the receiving chamber of female coupling member 800 by retainer locking member 842. Angled shoulder 860 on inner seal retainer 844 and corresponding angled shoulder 861 on outer seal retainer 845 provide a dovetail interfit with the angled ends of probe seal 838 that resists implosion of probe seal 838 in negative-pressure situations such as may occur upon withdrawal of the male probe from the receiving chamber of female coupling member 800. Probe seal 838 is described in U.S. Pat. No. 5,052,439. In the embodiment of FIG. 8A, corner O-ring 864 is provided to seal between inner seal retainer 844 and coupling body 810. In the embodiments of FIGS. 8B and 8C, circumferential O-ring 840' is provided to seal between inner seal retainer 844 and coupling body 810. In the embodiments of FIGS. 8A, 8B, and 8C, circumferential O-ring 840 is provided to seal between outer seal retainer 842 and coupling body 810.

Pressure-energized metal C-seal 880 in cylindrical recess 837 is retained on shoulder 835 by inner seal retainer 844. (As shown here, the C-seal 880 can have its convex side disposed adjacent the flat surface of the internal shoulder 835. As described below with reference to FIGS. 16A-16C and 17A-17C, the internal shoulder 835 of the retainer 844 may be contoured to fit the abutting convex surface of the C-seal 880 not unlike the contours provided in the various spacers described previously.) Pressure-energized metal C-seal 880 is configured to seal between the probe section of a male hydraulic coupling member inserted in the receiving chamber of female coupling member 800, 801 or 802 and body 810. Pressure-energized metal C-seal 881 is retained on shoulder 836 by retainer locking member 842. Pressure-energized metal C-seal 880 is configured to seal between the probe section of a male hydraulic coupling member inserted in the receiving chamber of female coupling member 800, 801 or 802 and outer seal retainer 845. In the illustrated embodiments of FIGS. 8A, 8B, and 8C, pressure-energized metal C-seal 880 is oriented so as to be energized by hydraulic fluid pressure within the coupling member. Pressure-energized metal C-seal 881 is oriented so as to be energized by hydrostatic fluid pressure from outside the coupling member. It will be appreciated by those skilled in the art that C-seals 880 and 881 may be independently orientated as desired to provide increased sealing effectiveness in response to either internal hydraulic fluid pressure or the hydrostatic head of seawater.

The embodiment illustrated in FIG. 8C is a variation on the embodiment of FIG. 8B. Expansion gaps 872 and 872' are provided in the embodiment of FIG. 8C to accommodate the expansion in the axial direction (of female hydraulic coupling member 802) of pressure-energized metal C-seals 880 and 881, when they are mechanically compressed in the radial direction by contact with the probe of a male hydraulic coupling member inserted in the receiving chamber of female hydraulic coupling member 802. Expansion gap 872 may be provided by providing a shoulder on the inner end of inner seal retainer 844. Expansion gap 872' may be provided by either increasing the depth of shoulder 836 or providing a shoulder on the inner end of retainer locking member 842.

FIGS. 9A-9C show an alternative embodiment of the seal assembly shown in FIG. 2A. Seal assembly 901 in the embodiment of FIGS. 9A-9C is comprised of shoulder spacer 995, hydraulic fluid pressure-energized metal C-seals 180, hydrostatic pressure-energized metal C-seals 181, metal C-seal supports 992 and 998, and spacer ring 991. As illustrated in FIG. 9C, the spacer 995, its C-seal 180, the support 992, and its C-seal 180 are seal stacks stacked one on another in cylindrical recess 937 on one side of the central spacer ring 991. Meanwhile, the support 998, its C-seal 181, the support 992, and its C-seal 181 are seal stacks stacked one on another in cylindrical recess 937 on the opposing side of the central spacer ring 991. As illustrated in FIG. 9C, shoulder spacer 995, metal C-seal supports 992 and 998, and spacer ring 991 have beveled surfaces adjacent their innermost surfaces so as to reduce friction during the insertion and withdrawal of a male probe member. The axial end surfaces of shoulder spacer 995, metal C-seal supports 992 and 998, and spacer ring 991 may be contoured to fit the abutting surfaces of metal C-seals 180 and 181. As before, the inward seal stacks (180, 992, 995) are arranged opposite the outward seal stacks (181, 992, 998) on both sides of the spacer ring 991. In this way, pressure-energized metal C-seals 180 are oriented so as to be energized by hydraulic fluid pressure within the coupling member. Pressure-energized metal C-seals 181 are oriented so as to be energized by hydrostatic fluid pressure from outside the coupling member.

FIG. 10 shows seal assembly 901 installed in cylindrical recess 937 in female coupling body 910 on internal shoulder 936 and retained thereon by a threaded seal cartridge comprising sleeve 950, crown seal 952, and outer shell 954. O-ring seals (not shown) may be provided in circumferential grooves 948. Sleeve 950 may seal to female coupling body 910 with O-ring seal 985 flanked by backup seals 984.

FIGS. 11A-11B illustrate a seal assembly 1101 having three hydraulic-pressure energized metal C-seals 180, and FIGS. 12A-12C shows the seal assembly 1101 with the three hydraulic-pressure energized metal C-seals 180 disposed in cylindrical recess 1137. Seal assembly 1101 in the embodiment of FIGS. 11A-11B is comprised of shoulder spacer 1195, hydraulic fluid pressure-energized metal C-seals 180, metal C-seal supports 1192 and spacer ring 1194. As illustrated in FIGS. 11A-11B, shoulder spacer 1195, metal C-seal supports 1192, and spacer ring 1194 have beveled surfaces adjacent their innermost surfaces so as to reduce friction during the insertion and withdrawal of a male probe member. The axial end surfaces of shoulder spacer 1195, metal C-seal supports 1192, and spacer ring 1194 may be contoured to fit the abutting surfaces of metal C-seals 180.

FIGS. 12A-12C show seal assembly 1101 in sealing engagement with female body 110 and the outer circumferential surface of male probe 271. FIG. 13 shows seal assembly 1101 installed in female coupling body 1110 on an internal shoulder thereof and retained thereon by a threaded seal cartridge comprising sleeve 1150, crown seal 1152, and outer shell 1154. O-ring seals (not shown) may be provided in circumferential grooves 1148. Sleeve 1150 may seal to female coupling body 1110 with O-ring seal 1162 in an annular groove on the inner face of sleeve 1150. As illustrated in FIGS. 11B, 12C, and 13, the spacer 1195, its C-seal 180, the support 1192, its C-seal 180, the support 1192, and its C-seal 180 are seal stacks stacked one on another on one side of the end spacer ring 1194 between the opposing shoulders of the cylindrical recess 1137.

FIGS. 14A-14B depict a typical, commercially available metal axial C-seal 180 suitable for use in certain embodiments of the invention. Sector C of the outer surface (and optionally the inner surface) may be gold plated (per AMS 2422 0.001-0.0015 inch thick). In the area indicated as sector B, gold plating is optional and may be incomplete. In one particular preferred metal C-seal, the material is Alloy 718 per AMS 5596 (0.010±0.001 inch thick prior to forming) and the area indicated as sector D (symmetrical, both sides) has a surface finish of 16 microns.

FIG. 15A depicts a portion of a female hydraulic coupling member 100 for coupling fluid pressure with a probe (not shown) of a corresponding male hydraulic coupling member. The female member 100 is similar to those disclosed above with reference to FIGS. 1, 2, 2A, 2B, 3B, 4B, 5A-5C, 7A-7C, 9A-9C, 10, 11B, 12A-12C, and 13, each of which include at least one C-seal ring and at least one spacer disposed in a cylindrical recess between a seal retainer and a shoulder in the housing, wherein the C-seal ring is exposed in the central bore or receiving chamber 101 in the female member 100 to create a seal with an inserted probe (not shown).

As shown in particular in FIG. 15A, the female member 100 includes a housing or body 170 having a cylindrical recess 137 formed by an upper shoulder 173, a sidewall 171, and a lower shoulder 179a. In this case, the lower shoulder 179a is formed by portion of an end of the seal cartridge (172, 178). The female member 100 also includes a seal stack (180, 190) disposed in the cylindrical recess 137.

As shown, the seal cartridge includes a generally cylindrical sleeve or inner seal retainer 178 at least partially inserted into an outer shell or outer seal retainer 172. The outer retainer 172 has an externally-threaded portion for engaging in the body 170. An O-ring face seal 175 is provided in a concentric annular groove on the inner end of the inner seal retainer 178. The retainers 172, 178 may have an interference fit with one other such that withdrawal of the outer retainer 172 from the body 170 effects removal of the entire seal cartridge. Spanner engagement holes may be provided in outer retainer 172 to allow an appropriate tool to be used to insert and/or remove the seal cartridge (comprised of elements 172, 176) as a unit.

The inner retainer 178 may have an angled shoulder for engaging a crown seal 174, which may have a correspondingly angled end to resist radial movement into the receiving chamber 101 under the influence of negative pressure as may occur during withdrawal of the male probe. The outer retainer 172 of the seal cartridge may also have an angled shoulder to likewise engage an opposing end of crown seal 174.

For its part, the crown seal 174 can be a double crown seal and can include optional circumferential O-ring seals 176 for sealing between the crown seal 174 and the seal cartridge sleeve 172. As before, the crown seal 152 can be machined from polyetheretherketone (PEEK) polymer that has been found to provide sealing effectiveness between the probe sections of male hydraulic coupling members and the receiving chambers of female hydraulic coupling members. Other materials suitable for probe seals are well-known in the art.

As best shown in FIG. 15B, the seal stack (180, 190) is disposed in the cylindrical recess 137 adjacent the internal sidewall 171. The seal stack (180, 190) includes a C-seal ring 180 and a spacer 190. As before, the C-seal ring 180 has first and second sides and has inner and outer dimensions. The first side is convex, and the second side defines an internal cavity. As shown, the second side of the C-seal ring 180 defining the internal cavity is disposed toward the upper shoulder 173 in the body's cylindrical recess 137.

The spacer 190 has first and second faces and has inside and outside surfaces. Similar to previous arrangements disclosed herein, the first (upper) face 199 defines a concavity or contour disposed adjacent the first convex side of the C-seal ring 180. Similar to previous arrangements disclosed herein, the second (bottom) face of the spacer 190 is disposed against the shoulder 179a of the cartridge's inner retainer 178. The inner dimension of the C-seal ring 180 is free to engage a probe's external surface in the receiving chamber 101, and the outer dimension of the C-seal ring 180 is free to engage the internal sidewall 171 of the cylindrical recess 137, each respectively with a sealing force increasing with an increase in the fluid pressure.

As will be appreciated with the benefit of the present disclosure, the arrangement in FIGS. 15A-15B can be expanded to include additional seal stacks having additional C-seal rings and spacers in the cylindrical recess 137 as disclosed with respect to FIGS. 1, 2, 2A, 2B, 3B, 4B, 5A-5C, 7A-7C, 9A-9C, 10, 11B, 12A-12C, and 13, for example.

FIG. 16A depicts a portion of a female hydraulic coupling member 100 for coupling fluid pressure with a probe (not shown) of a corresponding male hydraulic coupling member. The female member 100 is similar to those disclosed above so that like components have the same reference numerals and may not be described again.

Overall, the female member 100 is similar to those disclosed above with reference to FIGS. 3A, 3C, 4A, 4C, 6A-6C, and 8A-8C, each of which includes a C-seal ring disposed in a cylindrical recess 137 between a seal retainer and a shoulder in the housing body, wherein the C-seal ring sets adjacent the retainer and is exposed in a central passage or receiving chamber 101 in the female member 100 to create a seal with an inserted probe (103: FIG. 16C).

Here, the body 170 can include the concentric annular groove for the O-ring face seal 175 to seal against the inner end of the inner seal retainer 178.

As best shown in FIG. 16B, the arrangement here incorporates a curved, contoured surface (associated with the previously described spacer) formed directly into the shoulder 179a of the cylindrical recess 137. Namely, an inner edge of the seal retainer 178 defines a concave contour 179b circumferentially thereabout, and the C-seal ring 180 disposed in the cylindrical recess 137 of the central passage 101 adjacent the internal sidewall 171 fits against the concave contour 179b.

As before, the C-seal ring 180 has first and second sides and has inner and outer dimensions. The first side is convex, and the second side defines an internal cavity. As shown, the second side of the C-seal ring 180 defining the internal cavity is disposed toward the upper shoulder 173 of the cylindrical recess 137. For its part, the inside edge of the seal retainer 178 defines the concavity or counter 179b, against which the first convex side of the C-seal ring 180 can abut.

Similar to previous arrangements disclosed herein and as shown in FIG. 16C, the inner dimension of the C-seal ring 180 is free to engage the external surface of a male probe 103 inserted in the receiving chamber 101, and the outer dimension of the C-seal ring 180 is free to engage the internal sidewall 171, each respectively with a sealing force increasing with an increase in the fluid pressure. In this case, the fluid pressure is hydraulic pressure of the coupling 100.

As will be appreciated with the benefit of the present disclosure, the arrangement in FIGS. 16A-16C can be expanded to include additional seal stacks having C-seal rings and spacers as disclosed with respect to the other arrangements herein.

As just one such example, FIG. 17A depicts a portion of a female hydraulic coupling member 100 for coupling fluid pressure with a probe (not shown) of a corresponding male hydraulic coupling member. The female member 100 is similar to those disclosed above in FIGS. 16A-16B so that like components have the same reference numerals and may not be described again. Again, the body 170 includes the concentric annular groove for the O-ring face seal 175 to seal against the inner end of the inner seal retainer 178.

Additionally and as best shown in FIG. 17B, a C-seal ring 180 is disposed in the central passage 101 adjacent the internal surface 171. As before, the C-seal ring 180 has first and second sides and has inner and outer dimensions. The first side is convex, and the second side defines an internal cavity. As shown, the second side of the C-seal ring 180 defining the internal cavity is disposed toward a shoulder 173 in the member's body 170. For its part, the end of the seal retainer 178 defines a concavity 179b, which is disposed adjacent the first convex side of the C-seal ring 180.

In this arrangement, another spacer 195 is disposed against the internal surface 171 between the C-seal ring 180 and the shoulder 173. As shown, this spacer 195 includes an annular projection disposed in the internal cavity defined in the second side of the C-seal ring 180. Similar to previous arrangements disclosed herein, the inner dimension of the C-seal ring 180 is free to engage a probe's external surface in the receiving chamber 101, and the outer dimension of the C-seal ring 180 is free to engage the internal surface 171, each respectively with a sealing force increasing with an increase in the fluid pressure.

As further shown in FIGS. 17A-17B, this spacer 195 can be extended to form a cylindrical bore liner in the receiving chamber 101 in a manner similar to other arrangements disclosed herein, such as spacers 195, 995 in FIGS. 1, 2 and 9C. By comparison, FIG. 17C shows a detailed view of the female hydraulic coupling in FIGS. 17A-17B having several seal stacks (180, 191) according to the present disclosure disposed in the cylindrical recess 137 of the receiving chamber 101.

FIGS. 18A-18B illustrate a cross-sectional view and a detailed view of a female hydraulic coupling having yet another seal arrangement according to the present disclosure. The female member 100 is similar to those disclosed above so that like components have the same reference numerals and may not be described again.

As shown, a seal stack (180, 190, 195) is disposed in the cylindrical recess 137 adjacent the internal sidewall 171. The seal stack (180, 190, 195) includes a C-seal ring 180, a first spacer 190, and a second opposing spacer 195. As before, the C-seal ring 180 has first and second sides and has inner and outer dimensions. The first side is convex, and the second side defines an internal cavity. As shown, the second side of the C-seal ring 180 defining the internal cavity is disposed toward the upper shoulder 173 in the body's cylindrical recess 137.

The first spacer 190 has first and second faces and has inside and outside surfaces. The first (upper) face 199 defines a concavity or contour disposed adjacent the first convex side of the C-seal ring 180. The second (bottom) face of the spacer 190 is disposed against the shoulder 179a of the cartridge's inner retainer 178.

In the arrangement, the seal stack further includes the second opposing spacer 195 disposed against the internal surface 171 between the C-seal ring 180 and the shoulder (173). As shown, this opposing spacer 195 includes an annular projection disposed in the internal cavity defined in the second side of the C-seal ring 180. Similar to previous arrangements disclosed herein, the inner dimension of the C-seal ring 180 is free to engage a probe's external surface in the receiving chamber 101, and the outer dimension of the C-seal ring 180 is free to engage the internal surface 171, each respectively with a sealing force increasing with an increase in the fluid pressure.

As further shown in FIG. 18A, this opposing spacer 195 can be extended to form a cylindrical bore liner in the receiving chamber 101 in a manner similar to other arrangements disclosed herein.

As disclosed herein, undersea hydraulic couplings have been described and are equipped with multiple pressure-energized metal seals configured to seal between the body of the female member and the probe of a corresponding male hydraulic coupling member inserted in the receiving chamber of the female member. The sealing effectiveness of the seal may increase in response to fluid pressure which may be internal hydraulic fluid pressure or ambient hydrostatic pressure. The teachings of the present disclosure can apply to couplings for purposes other than communicating hydraulics. For example, the teachings can apply to couplings used for gas and other fluids, such as those typically used and encountered in the oil and gas industry. Regardless of the fluid, the sealing effectiveness of the seal arrangements disclosed herein may increase in response to fluid pressure which may be internal fluid pressure or ambient pressure.

In this disclosure, the pressure-energized C-seals have been described as metal C-seals inasmuch as those are the high-pressure C-seals that are commercially available as of the filing date hereof. It should be understood that high-pressure C-seals may, in the future, be fabricated from materials other than metal and such non-metal C-seals may be used in the practice of the invention.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A female member for coupling with a probe of a corresponding male member to communicate fluid having fluid pressure, the probe having an external surface, the female member comprising:
   a body defining a bore in which the probe is at least partially insertable, the bore defining a cylindrical recess having a first shoulder, a sidewall, and a second shoulder;
   an end ring disposed in the cylindrical recess and having opposing first and second faces, the first face disposed against the first shoulder, the second face defining a concave contour circumferentially thereabout; and a first C-seal ring disposed in the cylindrical recess adjacent the sidewall, the first C-seal ring having first and second sides and having inner and outer surfaces, the inner and outer surfaces respectively having inner and outer dimensions, the first side being convex and disposed adjacent the concave contour of the second face, the second side defining an internal cavity and disposed toward the second shoulder, wherein the inner and outer surfaces respectively have the inner and outer dimensions of the first C-seal ring, each of the inner and outer surfaces being free to engage the external surface of the probe and the sidewall of the bore respectively with a sealing force increasing with an increase in the fluid pressure.

2. The female member of claim 1, further comprising a first spacer disposed in the cylindrical recess and having a ring base, the ring base having first and second ends and having inside and outside surfaces, the first end having an annular projection extending therefrom, the annular projection disposed in the internal cavity defined in the second side of the first C-seal ring, the second end disposed toward the second shoulder of the cylindrical recess.

3. The female member of claim 2, wherein the second end of the first spacer abuts the second shoulder, and wherein an extent between the first and second ends of the first spacer comprises a bore liner between the first sidewall and the external surface of the probe insertable in the bore.

4. The female member of claim 2, wherein the first end of the first spacer defines a chamfer toward the inside surface.

5. The female member of claim 2, comprising at least one seal stack having a second C-seal ring and a second spacer and disposed between the second end of the first spacer and the second shoulder of the cylindrical recess, the second C-seal ring having first and second sides, the second spacer having first and second ends.

6. The female member of claim 5, wherein the second end of the second spacer abuts the second shoulder; and wherein the second end of the second spacer is truncated.

7. The female member of claim 5, wherein each first end of each of the first and second spacers defines a chamfer toward the inside surface.

8. The female member of claim 1, wherein the body comprises:
a housing defining one portion of the bore and having the second shoulder and the sidewall of the cylindrical recess; and
a retainer disposed in the housing, the retainer having a central passage and an edge, the central passage defining another portion of the bore, the edge of the retainer forming the first shoulder of the cylindrical recess.

9. The female member of claim 8, wherein the retainer comprises an internal seal disposed in the central passage and configured to seal with the external surface of the probe insertable therein.

10. The female member of claim 8, wherein the retainer comprises a cartridge having an outer shell affixed in the housing and having a sleeve retained in the housing by the outer shell.

11. The female member of claim 10, comprising an internal seal retained between the outer shell and the sleeve, the internal seal disposed in the central passage and being configured to seal with the external surface of the probe insertable therein.

12. The female member of claim 8, comprising a seal being sealably engaged between the retainer and the housing.

13. The female member of claim 12, wherein the seal comprises an O-ring face seal disposed in a concentric annular groove defined in the retainer and being sealably engaged with the housing adjacent to the edge.

14. The female member of claim 12, wherein the seal comprises an O-ring face seal disposed in a concentric annular groove defined in the housing and being sealably engaged with the retainer adjacent to the edge.

15. The female member of claim 12, wherein the seal comprises an outer seal stack disposed between the housing and the retainer.

16. The female member of claim 1, wherein the increase in the fluid pressure is an increase in hydraulic fluid pressure.

17. The female member of claim 1, wherein the bore of the body comprises a valve seat; and wherein the female member further comprises a poppet valve disposed in the bore of the body and being movable relative to the valve seat.

18. A coupling, comprising:
a male member having a probe to communicate fluid having fluid pressure, the probe having an external surface; and
a female member for coupling with the probe of the male member to communicate the fluid having the fluid pressure, the female member comprising:
a body defining a bore in which the probe is at least partially insertable, the bore defining a cylindrical recess having a first shoulder, a sidewall, and a second shoulder;
an end ring disposed in the cylindrical recess and having opposing first and second faces, the first face disposed against the first shoulder, the second face defining a concave contour circumferentially thereabout; and
a first C-seal ring disposed in the cylindrical recess adjacent the sidewall, the first C-seal ring having first and second sides and having inner and outer surfaces, the inner and outer surfaces respectively having inner and outer dimensions, the first side being convex and disposed adjacent the concave contour of the second face, the second side defining an internal cavity and disposed toward the second shoulder,
wherein the inner and outer surfaces respectively have the inner and outer dimensions of the first C-seal ring, each of the inner and outer surfaces being free to engage the external surface of the probe and the sidewall of the bore respectively with a sealing force increasing with an increase in the fluid pressure.

19. The female member of claim 1, wherein the bore extends internally into the body from an opening through which the probe is insertable; wherein the first shoulder of the cylindrical recess faces internally into the bore of the female member; and whereby the inner and outer surfaces of the first C-seal ring are each free to engage the external surface and the sidewall respectively in response to the increase in the fluid pressure internal to the female member.

20. The female member of claim 5, wherein the second end of the first spacer defines a concave contour circumferentially thereabout; and wherein the first side of the second C-seal ring is convex and is disposed adjacent the concave contour of the second end of the first spacer.

* * * * *